US012664927B2

(12) United States Patent
Kim et al.

(10) Patent No.: US 12,664,927 B2
(45) Date of Patent: Jun. 23, 2026

(54) APPARATUS FOR DRIVING DISPLAY PANEL USING CASCADED INTEGRATED CIRCUITS

(71) Applicant: LX SEMICON CO., LTD., Daejeon (KR)

(72) Inventors: Do Seok Kim, Daejeon (KR); Yong Hwan Mun, Daejeon (KR); Myung Yu Kim, Daejeon (KR); Hyun Pyo Cho, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 0 days.

(21) Appl. No.: 18/715,711

(22) PCT Filed: Dec. 2, 2022

(86) PCT No.: PCT/KR2022/019518
§ 371 (c)(1),
(2) Date: Jun. 1, 2024

(87) PCT Pub. No.: WO2023/101516
PCT Pub. Date: Jun. 8, 2023

(65) Prior Publication Data
US 2025/0037638 A1 Jan. 30, 2025

(30) Foreign Application Priority Data
Dec. 3, 2021 (KR) ........................ 10-2021-0172232

(51) Int. Cl.
*G09G 3/20* (2006.01)
*G06F 3/14* (2006.01)
(Continued)

(52) U.S. Cl.
CPC ............. *G09G 3/2096* (2013.01); *G06F 3/14* (2013.01); *G09G 3/006* (2013.01);
(Continued)

(58) Field of Classification Search
CPC ..................................................... G09G 3/2096
See application file for complete search history.

(56) References Cited

U.S. PATENT DOCUMENTS

| | | |
|---|---|---|
| 2011/0181558 A1 | 7/2011 | Jeon et al. |
| 2021/0193005 A1 | 6/2021 | Kim et al. |

FOREIGN PATENT DOCUMENTS

| | | |
|---|---|---|
| KR | 10-2005-0109028 A | 11/2005 |
| KR | 10-2006-0135544 A | 12/2006 |

(Continued)

OTHER PUBLICATIONS

Silicon Works Co Ltd [KR], Kim et al. KR 10-2020-0094912 A machine translation (Year: 2025).*

*Primary Examiner* — Gustavo Polo

(74) *Attorney, Agent, or Firm* — Birch, Stewart, Kolasch & Birch, LLP

(57) ABSTRACT

A display driving device includes two or more integrated circuits configured to receive image data from a device through a main communication line, wherein the two or more integrated circuits are connected in a cascade form for subsidiary communication, a first integrated circuit disposed at an end of the cascade transmits a first subsidiary communication signal to the device through the subsidiary communication, and a second integrated circuit disposed at a beginning of the cascade receives a feedback signal for the first subsidiary communication signal from the device, thereby providing a technique of simultaneously initializing all data driving devices even if an error occurs in one of a plurality of data driving devices and easily synchronizing operation modes of the data driving devices and a data processing device.

19 Claims, 14 Drawing Sheets

(51) Int. Cl.
    G09G 3/00         (2006.01)
    H04L 1/00         (2006.01)
(52) U.S. Cl.
    CPC ................. *G09G 2310/061* (2013.01); *G09G 2320/0673* (2013.01); *G09G 2330/023* (2013.01); *G09G 2330/12* (2013.01); *G09G 2340/0435* (2013.01); *G09G 2370/10* (2013.01); *H04L 1/0061* (2013.01)

(56)             References Cited

FOREIGN PATENT DOCUMENTS

| | | | |
|---|---|---|---|
| KR | 10-2020-0030186 | A | 3/2020 |
| KR | 10-2020-0094912 | A | 8/2020 |
| KR | 10-2021-0111664 | A | 9/2021 |
| WO | WO2015/141969 | A1 | 9/2015 |

\* cited by examiner

APPARATUS FOR DRIVING DISPLAY PANEL USING CASCADED INTEGRATED CIRCUITS

CROSS-REFERENCE TO RELATED APPLICATIONS

This application is a national phase entry of PCT International Application No. PCT/KR2022/019518 filed on Dec. 2, 2022, which claims the priority of Korean Application No. 10-2021-0172232 filed on Dec. 3, 2021, which are hereby incorporated by reference in their entirety.

BACKGROUND

Field of the Disclosure

The present disclosure relates to an apparatus for driving a display panel.

Description of the Background

A display panel is composed of a plurality of pixels arranged in a matrix form. Each pixel may have a color such as red (R), green (G) or blue (B) and displays an image on a display panel while emitting light in a grayscale according to image data.

Image data is transmitted from a data processing device to a data driving device. The image data is transmitted as a digital value, and the data driving device converts the image data into an analog voltage to drive each pixel.

Since image data indicates the grayscale value of each pixel individually or independently, the amount of image data increases as the number of pixels disposed in a display panel increases. Further, as a frame rate increases, the amount of image data to be transmitted per unit time increases.

Both the number of pixels disposed in a display panel and a frame rate are increasing due to a recent increase in the resolution of the display panel, and the speed of data communication in a display device increases to process the amount of image data increased due to high resolution.

SUMMARY

In view of such circumstances, the present disclosure is to provide an apparatus for driving a display panel that improves the performance of high-speed data communication.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display driving device includes two or more integrated circuits configured to receive image data from a device through a main communication line, wherein the two or more integrated circuits are connected in a cascade form for subsidiary communication, a first integrated circuit disposed at an end of the cascade transmits a first subsidiary communication signal to the device through the subsidiary communication, and a second integrated circuit disposed at a beginning of the cascade receives a feedback signal for the first subsidiary communication signal from the device.

In another aspect of the present disclosure, a display driving device includes a main communication circuit configured to transmit image data to two or more integrated circuits through main communication lines, and a subsidiary communication circuit configured to receive a first subsidiary communication signal from a first integrated circuit disposed at an end of a cascade among the two or more integrated circuits connected in a cascade form for subsidiary communication and to transmit a feedback signal for the first subsidiary communication signal to a second integrated circuit disposed at a beginning of the cascade.

In a further aspect of the present disclosure, a display driving device includes two or more integrated circuits connected in a cascade form for subsidiary communication, and a device configured to transmit image data to the two or more integrated circuits through main communication lines, to receive a first subsidiary communication signal from a first integrated circuit disposed at an end of the cascade, and to transmit a feedback signal for the first subsidiary communication signal to a second integrated circuit disposed at a beginning of the cascade.

Each integrated circuit may perform the subsidiary communication by combining an input signal received from a subsidiary communication input terminal and a state signal indicating a communication state of the main communication line and outputting the combined signal to a subsidiary communication output terminal.

The subsidiary communication output terminal of the first integrated circuit may be connected to the device, and the subsidiary communication input terminal of the second integrated circuit may be connected to the device.

As described above, according to the present disclosure, the accuracy and efficiency of data validation may be improved by checking data validity in data communication through different methods depending on the type and operation mode of transmitted/received data. Furthermore, according to the present disclosure, the amount of power consumed in data communication may be reduced, and the possibility of an erroneous operation in which an operation mode erroneously enters a power saving mode due to a communication error may be minimized.

Moreover, according to the present disclosure, even if an error occurs in one of a plurality of data driving devices, all the data driving devices may be initialized simultaneously, and operation modes of the data driving devices and a data processing device may be easily synchronized.

Further, according to the present disclosure, the operation modes of the data driving devices and the data processing device may be easily managed and a recovery time in case of occurrence of an error may be minimized.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

3

Figure 2:
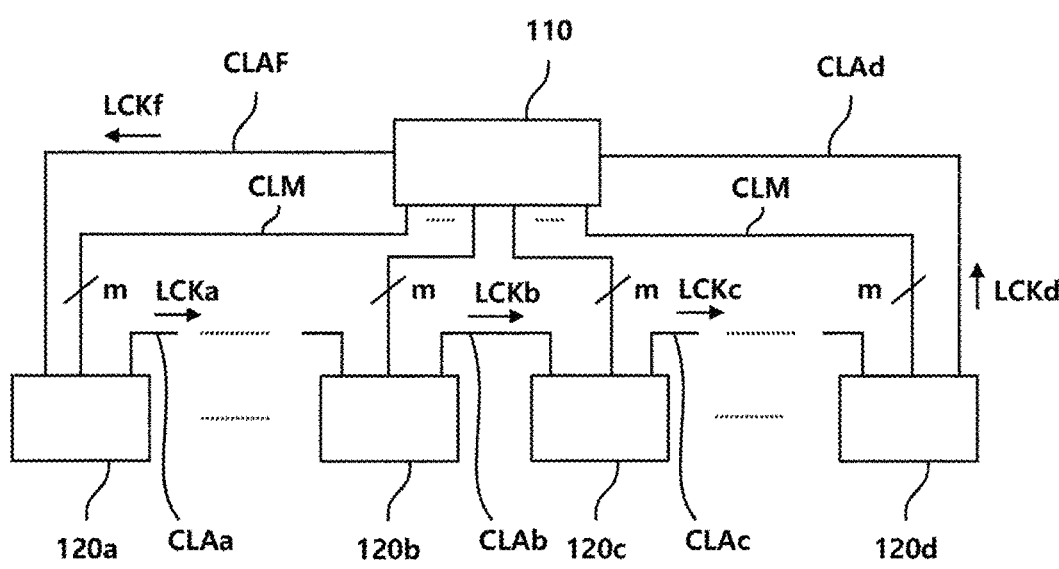
Figure 3:
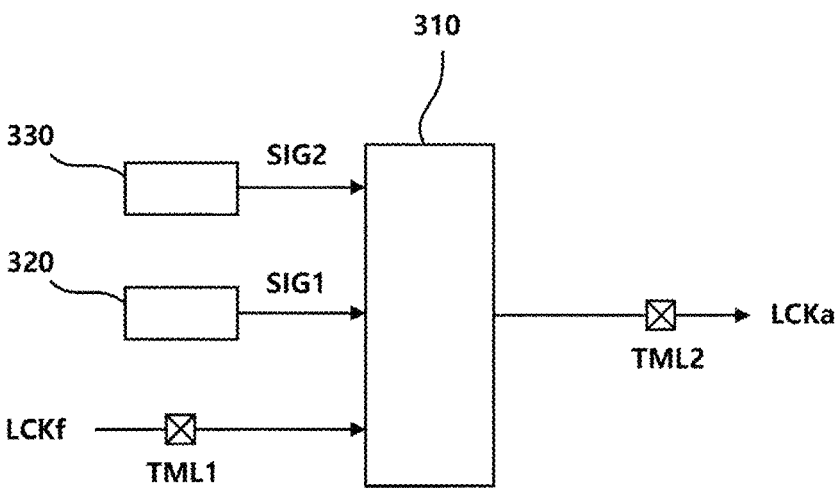
Figure 4:
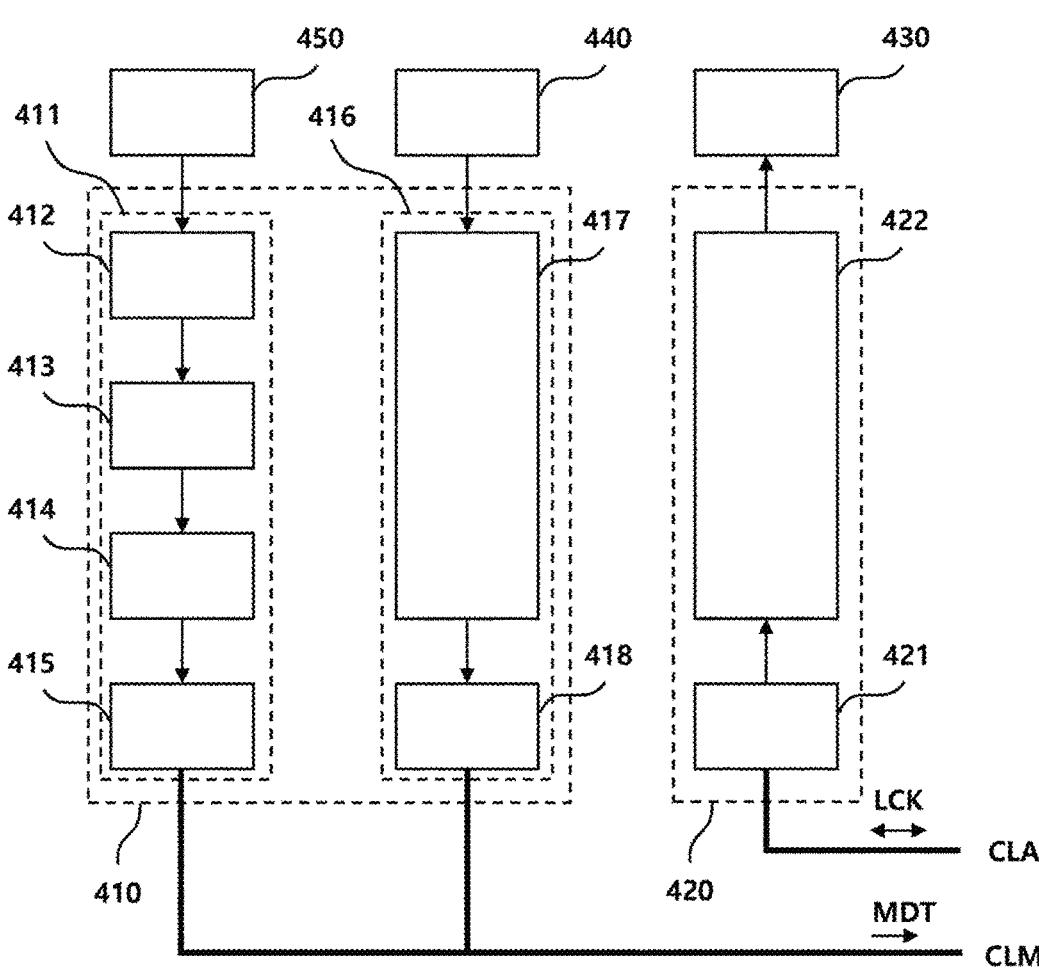
Figure 5:
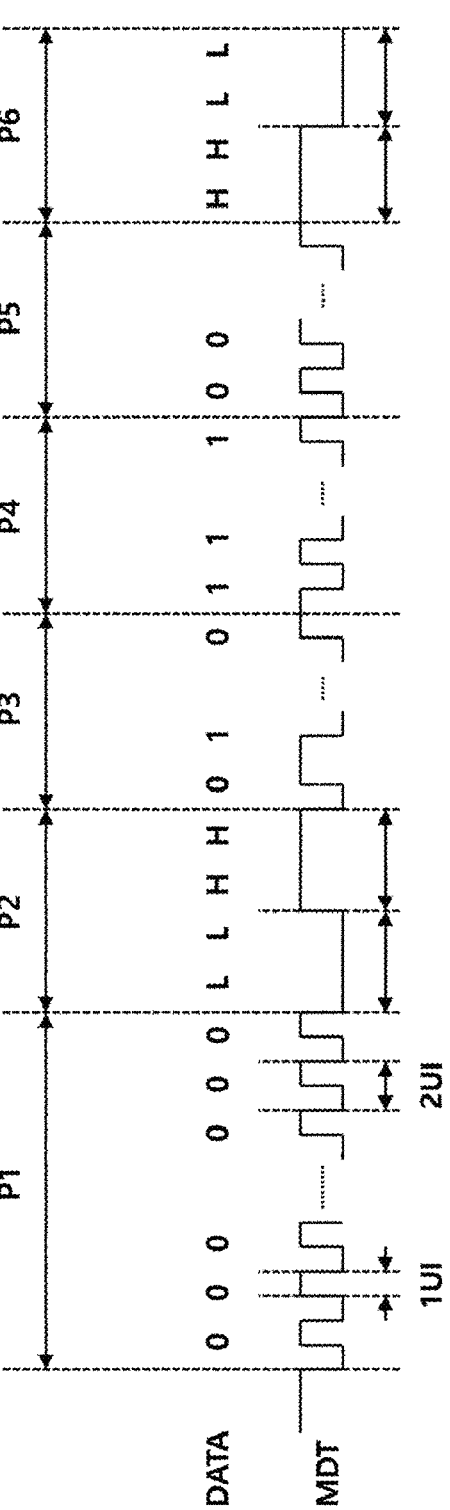
Figure 6:
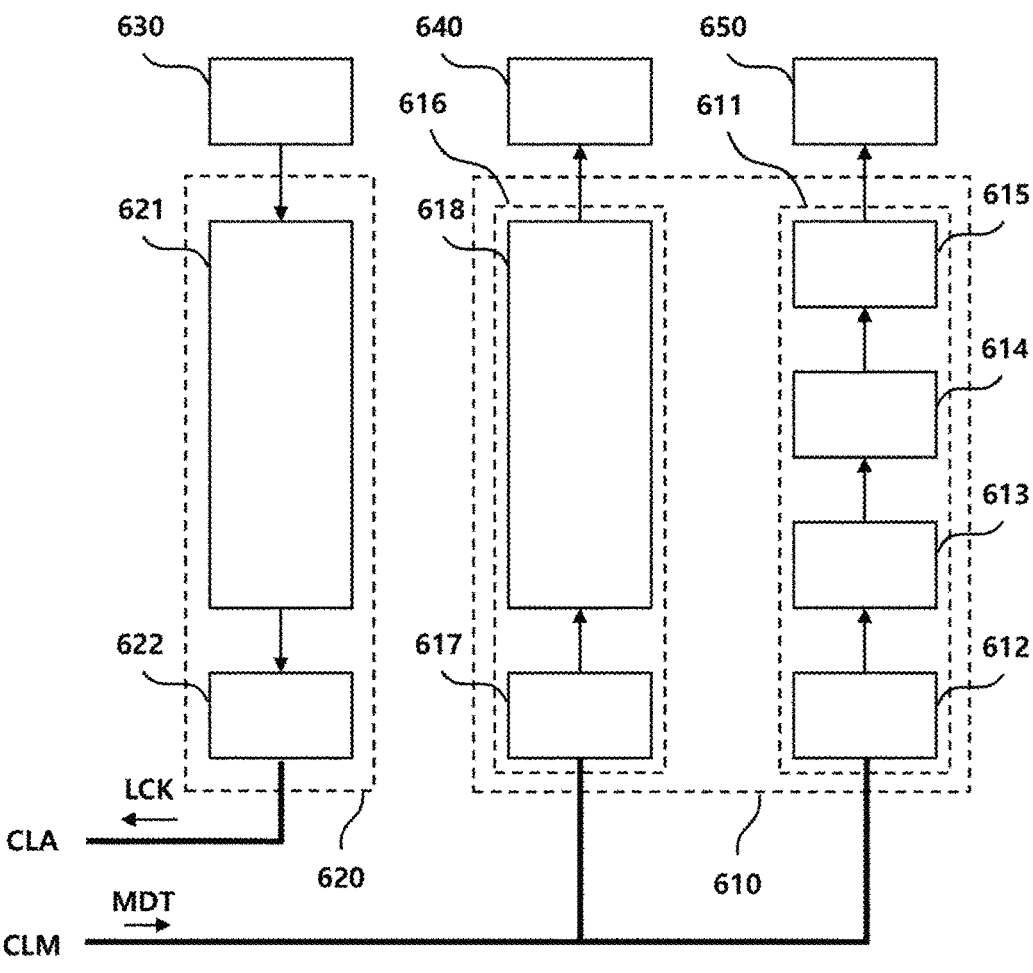
Figure 7:
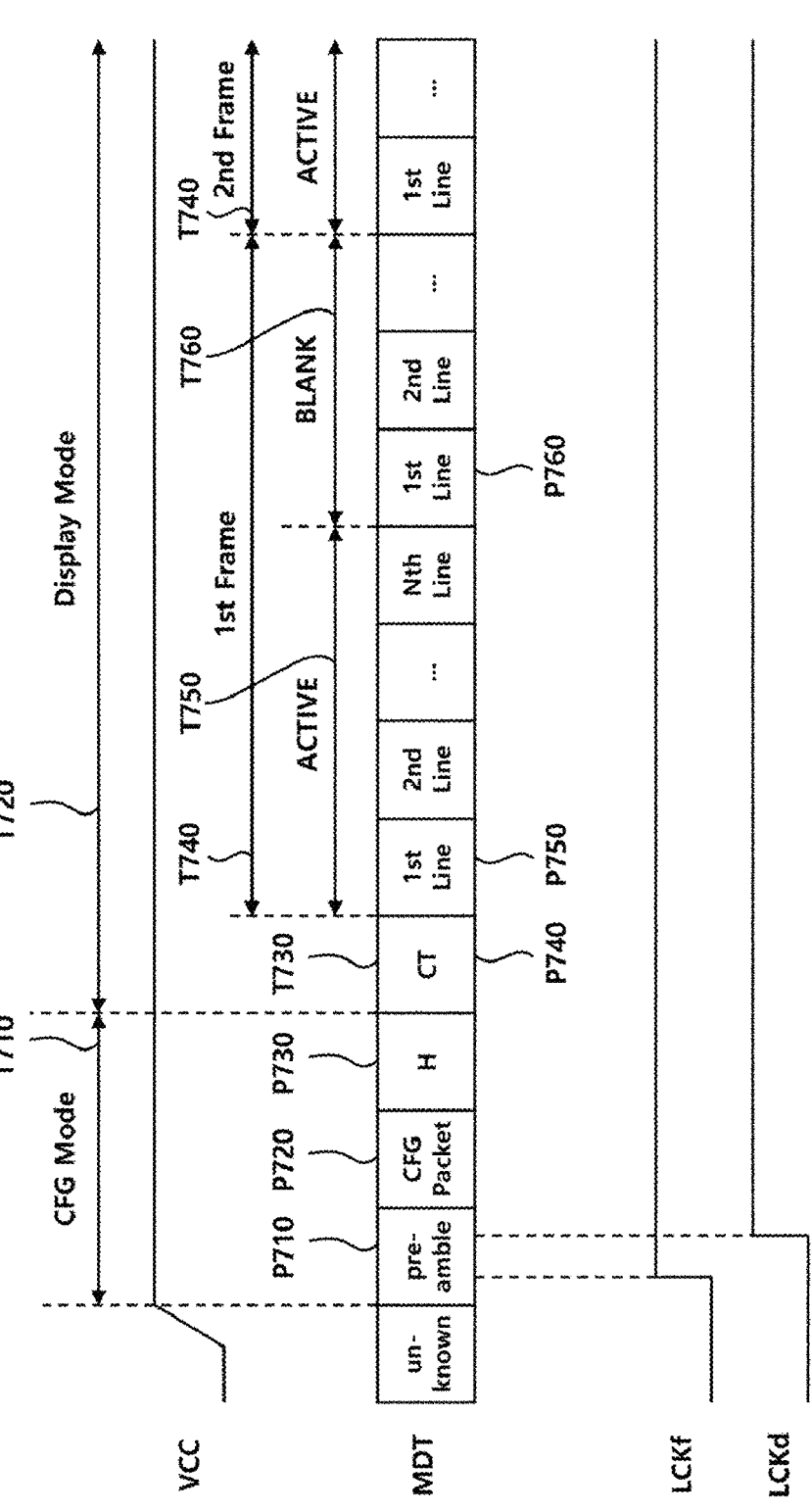

FIG. 2 is a diagram showing main communication and subsidiary communication between a data processing device and a data driving device according to an aspect of the present disclosure;

FIG. 3 is a block diagram of a part for processing a subsidiary communication signal in a first data driving integrated circuit of FIG. 2;

FIG. 4 is a block diagram of a data processing device according to an aspect of the present disclosure;

FIG. 5 is a diagram illustrating an example of a protocol of a main communication signal transmitted in Manchester code;

FIG. 6 is a block diagram of a data driving device according to an aspect of the present disclosure;

FIG. 7 is a diagram showing sequences of main signals according to an aspect.

Figure 8:
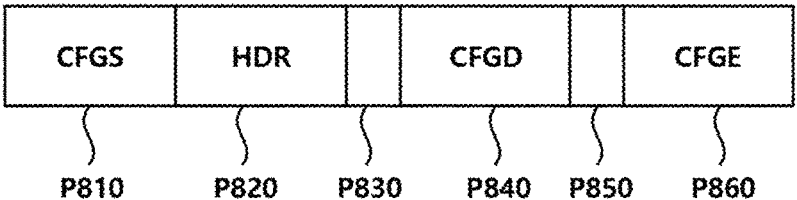
Figure 9:
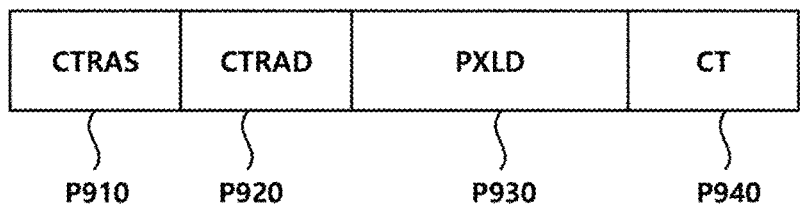
Figure 10:
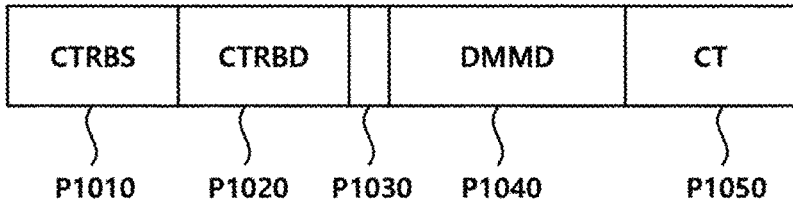
Figure 11:
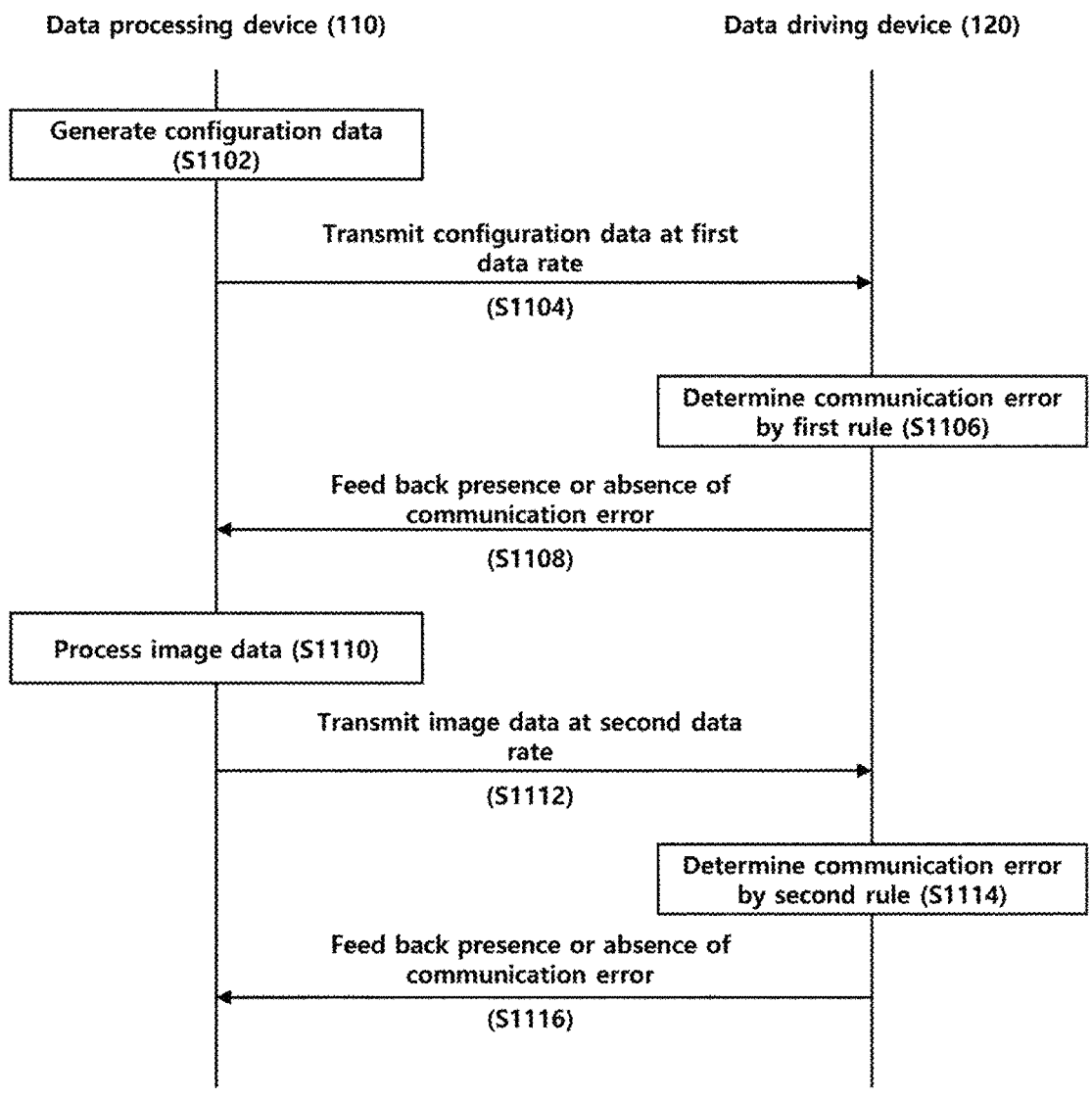
Figure 12:
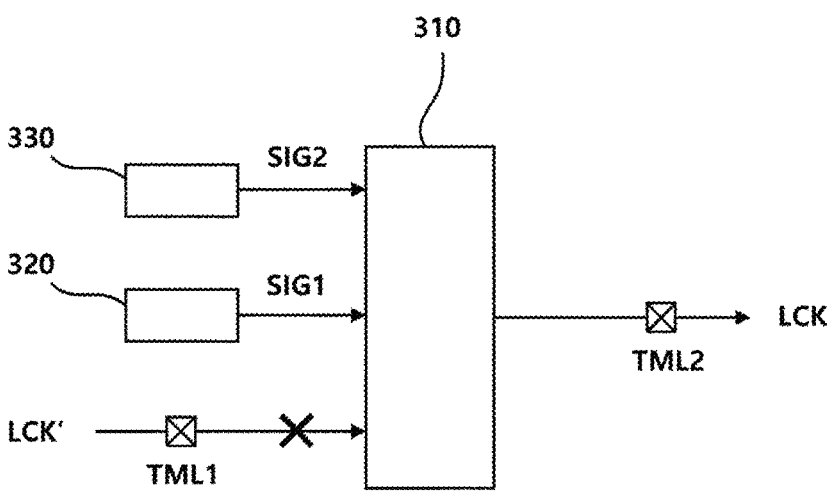
Figure 13:
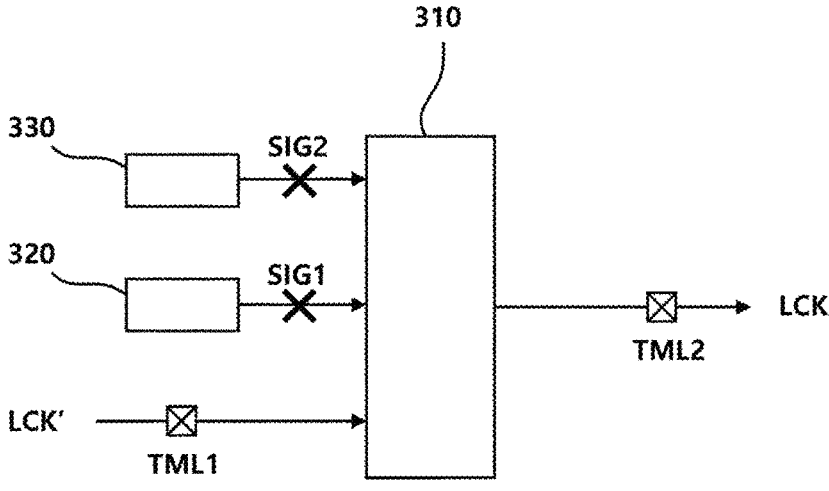
Figure 14:
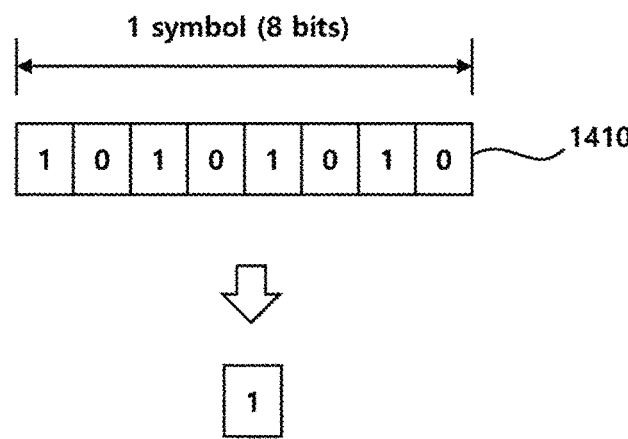
Figure 14:
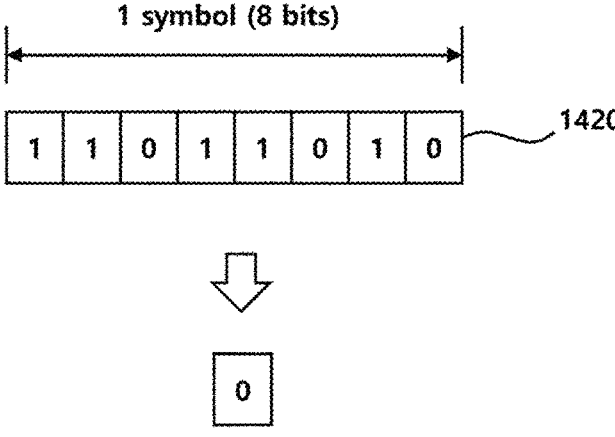
Figure 15:
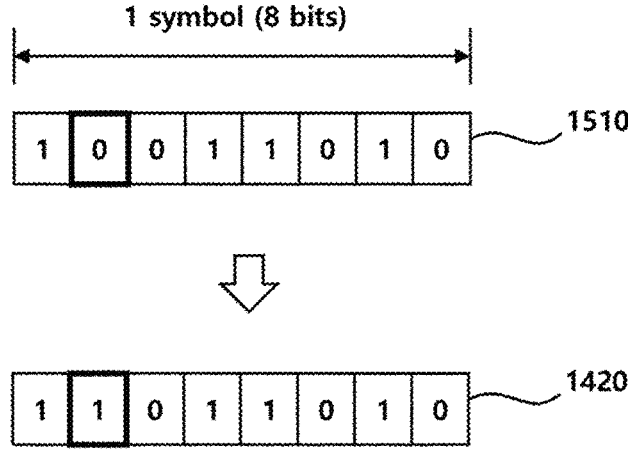
Figure 17:
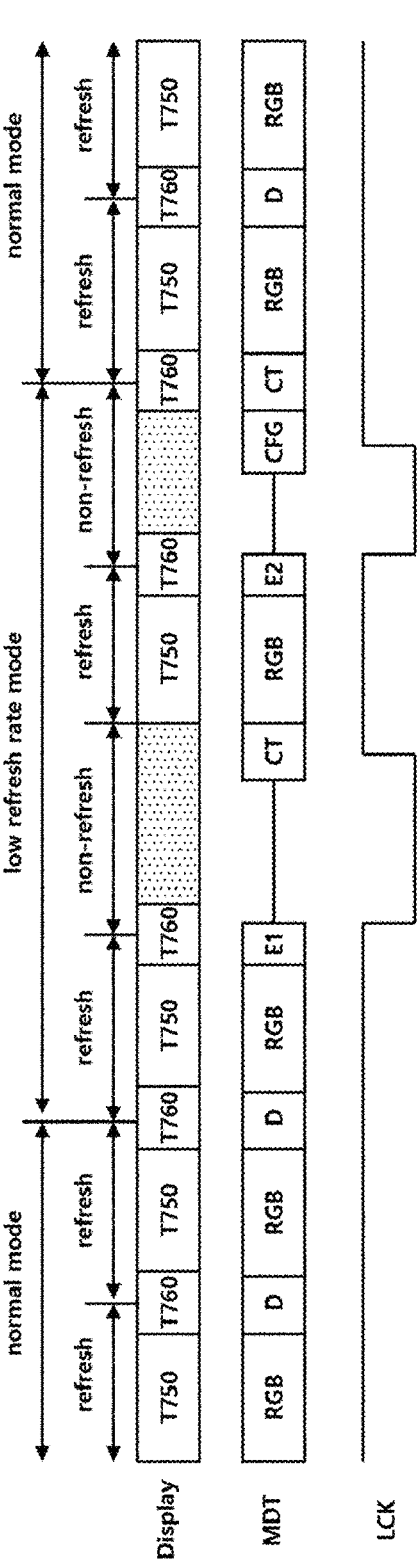

FIG. 8 is a configuration diagram of a configuration data packet according to an aspect of the present disclosure;

FIG. 9 is a configuration diagram of a line data packet according to an aspect of the present disclosure;

FIG. 10 is a configuration diagram of a control data packet according to an aspect of the present disclosure;

FIG. 11 is a flowchart of a data validation method according to an aspect of the present disclosure;

FIG. 12 is a diagram showing that a data driving integrated circuit ignores a subsidiary communication signal transmitted from another data driving integrated circuit according to an aspect of the present disclosure;

FIG. 13 is a diagram showing that a data driving integrated circuit bypasses a subsidiary communication signal transmitted from another data driving integrated circuit according to an aspect of the present disclosure;

FIG. 14 is a diagram illustrating a symbol setting value according to an aspect of the present disclosure;

FIG. 15 is a diagram showing repairing of a bit error of a symbol according to an aspect of the present disclosure;

Figure 16:
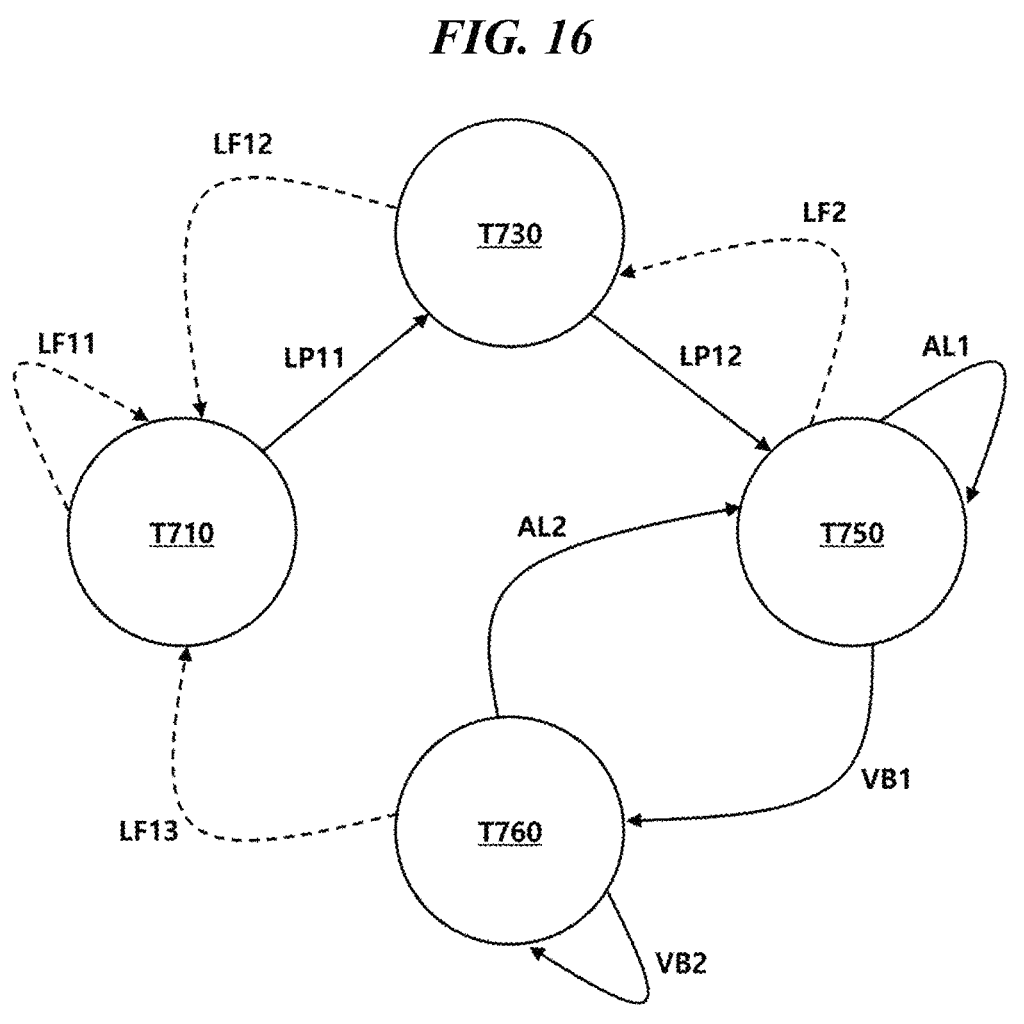

FIG. 16 is a diagram showing a mode conversion sequence of a display driving device according to an aspect of the present disclosure; and FIG. 17 is a diagram showing a sequence in which a display driving device performs a low-power operation according to an aspect of the present disclosure.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Figure 1:
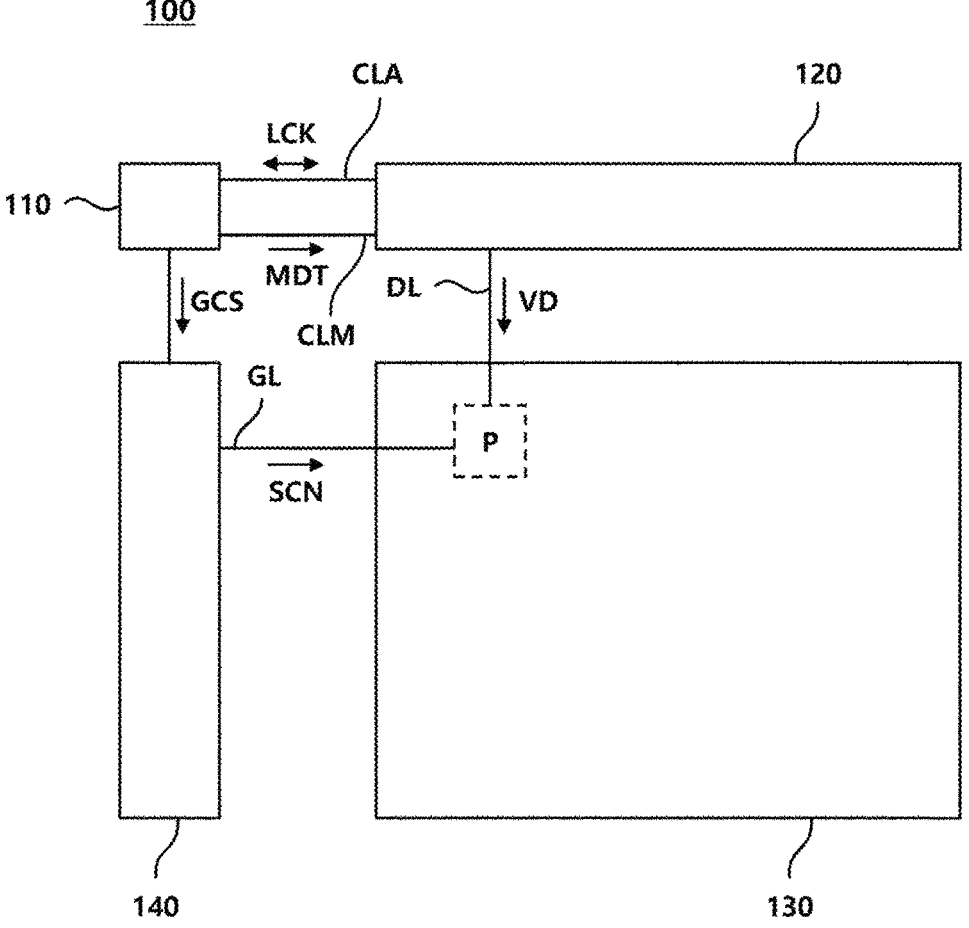
FIG. 1 is a block diagram of a display device according to an aspect of the present disclosure.

FIG. 1 is a block diagram of a display device according to an aspect.

Referring to FIG. 1, the display device 100 may include a plurality of display driving devices and a display panel 130. The display driving devices may be, for example, a data processing device 110, a data driving device 120, a gate driving device 140, and a host (not shown). Alternatively, the display driving devices may include two or more of the data processing device 110, the data driving device 120, the gate driving device 140, and a host (not shown).

The data processing device 110 may receive image data from other devices.

The data processing device 110 may process image data received from another device such that the image data is suitable for the data driving device 120 and transmit the processed image data to the data driving device 120. The data processing device 110 may perform digital gamma correction on the grayscale value of each pixel included in the image data or may perform compensation processing such that the image data matches the characteristics of each pixel.

The data driving device 120 may receive image data from the data processing device 110, generate a data voltage VD depending on a pixel grayscale value included in the image data, and provide the data voltage VD to a pixel P.

A plurality of pixels P may be disposed in the display panel 130. Further, each pixel P may be connected to the data driving device 120 through a data line DL and connected to the gate driving device 140 through a gate line GL.

A scan transistor may be disposed in each pixel P, a gate terminal of the scan transistor may be connected to the gate line GL, and a source terminal thereof may be connected to the data line DL. When the gate driving device 140 supplies a scan signal SCN to the gate line GL, the scan transistor is turned on and the data line DL is connected to the pixel P. After the data line DL is connected to the pixel P, the data voltage VD supplied by the data driving device 120 is transferred to the pixel P.

To synchronize the gate driving device 140 and the data driving device 120, the data processing device 110 may transmit a timing control signal to the gate driving device 140 and the data driving device 120.

The data processing device 110 may transmit a gate control signal GCS to the gate driving device 140. The gate control signal GCS may include the aforementioned timing control signal. The gate driving device 140 may generate a scan signal SCN according to the gate control signal GCS and supply the scan signal SCN to the pixel P through the gate line GL.

At least two types of communication lines CLM and CLA may be disposed between the data processing device 110 and the data driving device 120. The data processing device 110 may transmit a first communication signal MDT through the first communication line CLM and transmit or receive a second communication signal LCK through the second communication line CLA. Hereinafter, for convenience of description, the first communication line CLM is referred to as a main communication line and the second communication line CLA is referred to as a subsidiary communication line. Further, the first communication signal MDT is referred to as a main communication signal and the second communication signal LCK is referred to as a subsidiary communication signal.

The data processing device 110 may transmit image data and the timing control signal to the data driving device 120 through the main communication signal MDT, and the data driving device 120 may transmit state information to the data processing device 110 through the subsidiary communication signal LCK.

FIG. 2 is a diagram showing main communication and subsidiary communication between a data processing device and a data driving device according to an aspect.

Referring to FIG. 2, the data driving device may be composed of a plurality of data driving integrated circuits 120a, 120b, 120c, and 120d.

In addition, the data processing device 110 may be connected to the data driving integrated circuits 120a, 120b, 120c, and 120d through main communication lines CLM such that communication may be performed therebetween. The data processing device 110 may be one-to-one connected to each of the data driving integrated circuits 120a, 120b, 120c, and 120d such that communication may be performed therebetween. For example, the data processing device 110 may be one-to-one connected to the first data driving integrated circuit 120*a* and one-to-one connected to the second data driving integrated circuit 120*b* such that communication may be performed therebetween.

Each main communication line CLM may be composed of electrically insulated m (m being a natural number) lines. In addition, the m lines may form pairs and low voltage differential signaling (LVDS) communication may be performed for each pair.

This communication connection structure and main communication signals (refer to MDT of FIG. 1) transmitted and received between the data processing device 110 and the data driving integrated circuits 120*a*, 120*b*, 120*c*, and 120*d* may be collectively referred to as main communication.

The data processing device 110 and the data driving integrated circuits 120*a*, 120*b*, 120*c*, and 120*d* may transmit and receive information through subsidiary communication in addition to main communication.

Subsidiary communication between the data driving integrated circuits 120*a*, 120*b*, 120*c*, and 120*d* may be connected in a cascade form. For example, the first data driving integrated circuit 120*a* disposed at the beginning of a cascade may transmit a first subsidiary communication signal LCKa to the second data driving integrated circuit 120*b* through a first subsidiary communication line CLAa. Further, the second data driving integrated circuit 120*b* may generate a second subsidiary communication signal LCKb by combining an internally generated state signal and the first subsidiary communication signal LCKa and transmit the second subsidiary communication signal LCKb to the third data driving integrated circuit 120*c* through a second subsidiary communication line CLAb. In addition, the third data driving integrated circuit 120*c* may generate a third subsidiary communication signal LCKc by combining an internally generated state signal and the second subsidiary communication signal LCKb and transmit the third subsidiary communication signal LCKc to the fourth data driving integrated circuit 120*d* through a third subsidiary communication line CLAc.

The fourth data driving integrated circuit 120*d* disposed at the end of the cascade may generate a fourth subsidiary communication signal LCKd by combining an internally generated state signal and the third subsidiary communication signal LCKc and transmit the fourth subsidiary communication signal LCKd to the data processing device 110 through a fourth subsidiary communication line CLAd. Here, the fourth data driving integrated circuit 120*d* disposed at the end of the cascade transmits the subsidiary communication signal to the data processing device 110 through subsidiary communication.

The data processing device 110 may check the states of the data driving integrated circuits 120*a*, 120*b*, 120*c*, and 120*d* based on the subsidiary communication signal received from the fourth data driving integrated circuit 120*d* disposed at the end of the cascade. Further, the data processing device 110 may transmit a subsidiary communication feedback signal LCKf for the subsidiary communication signal to the first data driving integrated circuit 120*a* disposed at the beginning of the cascade through a subsidiary communication feedback line CLAF. For example, the data processing device 110 may generate the subsidiary communication feedback signal LCKf in the same form as the subsidiary communication signal received from the fourth data driving integrated circuit 120*d* and transmit the same to the first data driving integrated circuit 120*a*.

FIG. 3 is a block diagram of a part for processing a subsidiary communication signal in the first data driving integrated circuit of FIG. 2.

Referring to FIG. 3, the first data driving integrated circuit may include a subsidiary communication input terminal TML1 and a subsidiary communication output terminal TML2 and may include a signal combination circuit 310 and a state signal generation circuit 320.

The signal combination circuit 310 may combine an input signal received from the subsidiary communication input terminal TML1 and a state signal SIG1 generated by the state signal generation circuit 320 to generate an output signal and output the output signal through the subsidiary communication output terminal TML2. Here, the input signal may be the aforementioned subsidiary communication feedback signal LCKf, and the output signal may be the aforementioned first subsidiary communication signal LCKa.

The status signal generation circuit 320 may check the communication state of the main communication line and generate the state signal SIG1 according to the communication state of the main communication line. For example, the state signal generation circuit 320 may generate a state signal SIG1 having a high level voltage when the communication state of the main communication line is normal and may generate a state signal SIG1 having a low level voltage when the communication state of the main communication line is abnormal.

The signal combination circuit 310 may generate an output signal by combining signals through an AND operation. For example, the signal combination circuit 310 may generate an output signal by combining the input signal received from the subsidiary communication input terminal TML1 and the state signal SIG1 generated by the state signal generation circuit 320 through an AND operation.

The first data driving integrated circuit may further include a performance evaluation feedback circuit 330, and the performance evaluation feedback circuit 330 may evaluate the communication performance of the main communication line and generate a performance evaluation feedback signal SIG2 indicating the communication performance.

In addition, the signal combination circuit 310 may generate an output signal by combining the state signal SIG1 and the performance evaluation feedback signal SIG2.

For example, the first data driving integrated circuit may receive a bit error rate (BER) test pattern from the data processing device and evaluate communication performance based on a recognition rate for the BER test pattern. In addition, the performance evaluation feedback circuit 330 may generate a performance evaluation feedback signal SIG2 having a high level voltage when the recognition rate is a certain level or higher and generate a performance evaluation feedback signal SIG2 having a low level voltage when the recognition rate is lower than the certain level.

The signal combination circuit 310 may have various combination modes and, for example, the signal combination circuit 310 may generate an output signal by combining only the input signal received from the subsidiary communication input terminal TML1 and the state signal SIG1 generated by the state signal generation circuit 320 through an AND operation in a first combination mode. In addition, the signal combination circuit 310 may generate an output signal by combining only the state signal SIG1 and the performance evaluation feedback signal SIG2 through an AND operation in a second combination mode. Further, the signal combination circuit 310 may bypass the input signal as an output signal in a third combination mode.

Although FIG. 3 shows the part for processing the subsidiary communication signal in the first data driving integrated circuit, the same configuration may be included in other data driving integrated circuits. Each data driving integrated circuit may be different only in an arrangement position in the cascade.

Referring to FIG. 2 and FIG. 3 together, each of the data driving integrated circuit 120a, 120b, 120c, and 120d includes the same terminals TML1 and TML2 as those of the first data driving integrated circuit 120a, the signal combination circuit 310, the state signal generation circuit 320, and the performance evaluation feedback circuit 330. In the connection relationship of subsidiary communication, the subsidiary communication input terminal of the first data driving integrated circuit 120a disposed at the beginning of the cascade may be connected to the data processing device 110, and the subsidiary communication output terminal may be connected to the second data driving integrated circuit 120b. Further, the subsidiary communication input terminal of the fourth data driving integrated circuit 120d disposed at the end of the cascade may be connected to the third data driving integrated circuit 120c, and the subsidiary communication output terminal may be connected to the data processing device 110.

Each of the data driving integrated circuits 120a, 120b, 120c, and 120d may check whether an error has occurred therein or in other data driving integrated circuits through the cascade connection structure and the subsidiary communication feedback signal LCKf.

For example, the fourth data driving integrated circuit 120d may determine that an error has occurred therein when the internal state signal SIG1 has a low level voltage. In addition, the fourth data driving integrated circuit 120d may determine that an error has occurred in at least one of the first data driving integrated circuit 120a, the second data driving integrated circuit 120b, and the third data driving integrated circuit 120c when the input signal has a low level voltage.

As another example, the first data driving integrated circuit 120a may determine that an error has occurred therein when the internal state signal SIG1 has a low level voltage. In addition, the first data driving integrated circuit 120a may determine that an error has occurred in at least one of the second data driving integrated circuit 120b, the third data driving integrated circuit 120c, and the fourth data driving integrated circuit 120d when the input signal has a low level voltage. The first data driving integrated circuit 120a receives the subsidiary communication feedback signal LCKf from the data processing device 110. However, since the data processing device 110 generates the subsidiary communication feedback signal LCKf according to the fourth subsidiary communication signal LCKd reflecting the state of each of the data driving integrated circuits 120a, 120b, 120c, and 120d, the first data driving integrated circuit 120a may determine the state of each of the data driving integrated circuits 120a, 120b, 120c, and 120d.

When one data driving integrated circuit determines that an error has occurred therein or another data driving integrated circuit, the data driving integrated circuit may switch to a mode corresponding to the abnormality.

For example, the first data driving integrated circuit 120a may switch to a mode for retraining a communication clock signal of the main communication line upon determining that an abnormality has occurred therein or in at least one of the second data driving integrated circuit 120b, the third data driving integrated circuit 120c, and the fourth data driving integrated circuit 120d. When it is determined that communication on the main communication line is abnormal, the state signal SIG1 has a low level voltage, and thus the subsidiary communication signal may have a low level voltage. Then, the data processing device 110 may switch to the mode for retraining the communication clock signal of the main communication line upon confirming that the subsidiary communication signal has a low level voltage and transmit a clock training signal for retraining the communication clock signal to the data driving integrated circuits 120a, 120b, 120c, and 120d.

If an error occurs in a data driving integrated circuit other than the first data driving integrated circuit 120a among the data driving integrated circuits 120a, 120b, 120c, and 120d in the cascade structure, the first data driving integrated circuit 120a may not be able to detect an abnormality in another data driving integrated circuit only with the subsidiary communication signal in the cascade structure. The subsidiary communication feedback signal LCKf is a signal for compensating for this problem and allows the data driving integrated circuits 120a, 120b, 120c, and 120d belonging to one cascade structure to detect an error almost simultaneously.

Meanwhile, the data processing device 110 may use the subsidiary communication feedback signal LCKf for other purposes. For example, the data processing device 110 may transmit a reset signal through the subsidiary communication feedback signal LCKf. The data processing device 110 may generate a reset signal, for example, a signal having a low level voltage, regardless of the fourth subsidiary communication signal LCKd and transmit the reset signal to the first data driving integrated circuit 120a through the subsidiary communication feedback line CLAF. In addition, the data driving integrated circuits 120a, 120b, 120c, and 120d may sequentially propagate the reset signal through subsidiary communication in the cascade structure. Through this subsidiary communication, all of the data driving integrated circuits 120a, 120b, 120c, and 120d may receive the reset signal.

When the reset signal is received, the data driving integrated circuits 120a, 120b, 120c, and 120d may enter an initialization state. For example, each of the data driving integrated circuits 120a, 120b, 120c, and 120d may lower the data rate of main communication through the main communication line after the reset signal is received.

The data driving device may include a plurality of data driving integrated circuits that receive image data from the data processing device through the main communication line. The plurality of data driving integrated circuits may be connected in a cascade form for subsidiary communication. The fourth data driving integrated circuit disposed at the end of the cascade may transmit the fourth subsidiary communication signal to the data processing device through subsidiary communication, and the first data driving integrated circuit disposed at the beginning of the cascade may receive a subsidiary communication feedback signal for the fourth subsidiary communication signal from the data processing device.

Each data driving integrated circuit may perform subsidiary communication by combining an input signal received from a subsidiary communication input terminal and a state signal representing a communication state of a main communication line and outputting the combined signal to a subsidiary communication output terminal. In addition, each data driving integrated circuit may output a subsidiary communication signal obtained by combining the input signal and the state signal through an AND operation to the subsidiary communication output terminal.

The subsidiary communication output terminal of the fourth data driving integrated circuit may be connected to the data processing device, and the subsidiary communication input terminal of the first data driving integrated circuit may be connected to the data processing device.

Each data driving integrated circuit may determine that an error has occurred in at least one data driving integrated circuit among the plurality of data driving integrated circuits when the input signal or the state signal has a low level voltage.

Each data driving integrated circuit may switch to a mode for retraining the communication clock signal of the main communication line when the input signal or the status signal has a low level voltage.

When the first subsidiary communication signal has a low level voltage, the data processing device may generate a subsidiary communication feedback signal at a low level voltage and transmit the subsidiary communication feedback signal.

The data processing device may transmit a reset signal through a feedback signal, and the plurality of data driving integrated circuits may receive the reset signal through subsidiary communication. In addition, each data driving integrated circuit may reduce the data rate of main communication through the main communication line after the reset signal is received. In addition, each data driving integrated circuit may receive image data in a high-speed mode and receive configuration data for the high-speed mode in a low-speed mode having a lower data rate than the high-speed mode.

The data processing device may include a main communication circuit and a subsidiary communication circuit. In addition, the main communication circuit may transmit image data to the plurality of data driving integrated circuits through main communication lines. In addition, the subsidiary communication circuit receives the fourth subsidiary communication signal from the fourth data driving integrated circuit disposed at the end of the cascade from among the plurality of data driving integrated circuits connected in a cascade form for subsidiary communication, and transmit a subsidiary communication feedback signal for the subsidiary communication signal to the first data driving integrated circuit disposed at the beginning of the cascade.

The main communication circuit may transmit a clock training signal for retraining a communication clock signal of image data to the main communication lines when the fourth subsidiary communication signal indicates an abnormal state of at least one of the main communication lines.

In addition, the main communication circuit may transmit image data in the high-speed mode and transmit configuration data for the high-speed mode to the main communication lines in the low-speed mode having a lower data rate than the high-speed mode.

Further, the main communication circuit may switch from the high-speed mode to the low-speed mode when the fourth subsidiary communication signal indicates an abnormal state of at least one of the main communication lines.

The subsidiary communication circuit may transmit a reset signal through the subsidiary communication feedback signal to reset the plurality of data driving integrated circuits.

When the fourth subsidiary communication signal has a low level voltage, the subsidiary communication circuit may generate a feedback signal at a low level voltage and transmit the feedback signal. Further, the main communication circuit may transmit a clock training signal for retraining the communication clock signal of image data to the main communication lines when the fourth subsidiary communication signal has a low level voltage.

FIG. 4 is a block diagram of the data processing device according to an aspect.

Referring to FIG. 4, the data processing device may include a P-main communication circuit 410, a P-subsidiary communication circuit 420, a P-control circuit 430, a P-memory 440, and an image data processing circuit 450.

The P-main communication circuit 410 may transmit the main communication signal MDT to the data driving device through the main communication line CLM. The P-main communication circuit 410 may transmit image data and first control data in an active period through the main communication line CLM and may transmit second control data in a blank period. The data driving device may drive pixels of the display panel according to the image data. The first control data may include a control value applied in units of lines or pixels of the display panel, and the second control data may include a control value applied in a longer cycle than the line unit or pixel unit or a control value applied on a frame by frame basis.

The P-main communication circuit 410 may transmit configuration data at a first data rate through the main communication line CLM. In addition, the P-main communication circuit 410 may transmit image data, the first control data, and the second control data at a second data rate higher than the first data rate through the main communication line CLM. A mode in which communication is performed at the first data rate may be referred to as a low-speed communication mode, and a mode in which communication is performed at the second data rate may be referred to as a high-speed communication mode.

The P-main communication circuit 410 may include a P-high-speed communication circuit 411 that performs high-speed communication and a P-low-speed communication circuit 416 that performs low-speed communication.

The P-high-speed communication circuit 411 may include a packer 412, a scrambler 413, an encoder 414, and a first serializer 415.

The packer 412 may receive image data from the image data processing circuit 450 that processes the image data. Further, the packer 412 may receive the first control data and/or the second control data from the P-control circuit 430 or the P-memory 440. In addition, the packer 412 may generate transmission data by packaging at least one of the image data, the first control data, and the second control data.

The scrambler 413 may scramble the transmission data. Scrambling is a process of mixing bits of data to be transmitted and may prevent the same bit, for example, 1 or 0, from being consecutively arranged more than K (K being a natural number equal to or greater than 2) times in a data transmission stream. Scrambling is performed according to a rule agreed in advance, and the data driving device may restore a stream in which bits are mixed to original data according to the rule agreed in advance.

The scrambler 413 may scramble only the image data and may not apply scrambling to the first control data or the second control data.

The encoder 414 may encode P bits of a transmission stream into Q bits in transmission data. P may be, for example, 6, and Q may be, for example, 7. Encoding 6-bit data into 7-bit data is also called 6B7B encoding. 6B7B encoding is a kind of encoding method using DC balance code.

The encoder 414 may encode the transmission data such that the number of bits of the transmission stream increases. The encoded data may be decoded into DC balance code, for example, 6B7B, by the data driving device. In another aspect, the encoded transmission data may be restored to the original bits by the data driving device.

The encoder 414 may use limited run length code (LRLC) in encoding of transmission data. "Run length" means that the same bits are arranged consecutively, and LRLC is to encode transmission data such that "run length" does not appear to be larger than a certain size in the transmission data.

When the encoder 414 encodes data using LRLC, the data driving device may decode the data according to the LRLC method used by the encoder 414.

The encoder 414 may divide transmission data into predetermined units and encode the data by units. The encoder 414 may perform DC balance coding or LRLC coding according to an encoding table stored in the P-memory 440. The data driving device has a decoding table corresponding to the encoding table and may perform decoding on each piece of unit data according to the decoding table.

Transmission data transmitted in parallel in the data processing device 110 may be serially converted by the first serializer 415. The first serializer 415 may transmit the serially converted transmission data to the data driving device. Here, the serially transmitted data may form a transmission stream and may take the form of a main communication signal MDT.

The main communication line CLM may be composed of m (m being a natural number) electrically insulated lines. In addition, the m lines may form pairs, and low voltage differential signaling (LVDS) communication may be performed for each pair. When the main communication line CLM includes two or more pairs, the first serializer 415 may distribute transmission data to the pairs and transmit the same.

Transmission data is composed of bits, and a plurality of bits may form one symbol. One symbol may be composed of 8 bits or 10 bits. A plurality of symbols may constitute one piece of pixel data. Pixel data may sequentially include information corresponding to sub-pixels such as R (Red), G (Green), and B (Blue). The data driving device may align data, serially received in bits, in bytes and arrange the data on a pixel by pixel basis.

The P-low-speed communication circuit 416 may include a configuration data processing circuit 417 and a second serializer 418.

The configuration data processing circuit 417 may receive a setting value from the P-memory 440 and/or the P-control circuit 430 and generate configuration data corresponding to the setting value.

The configuration data is data transmitted at a low rate, and may include setting values of the data driving device required before high-speed communication. For example, the configuration data may include setting values of a circuit that performs high-speed communication in the data driving device.

The second serializer 418 may serially convert the configuration data and transmit the serially converted configuration data to the data driving device through the main communication line CLM.

The second serializer 418 may convert the configuration data into the form of Manchester code and transmit the same.

FIG. 5 is a diagram showing an example of a protocol of a main communication signal transmitted in Manchester code.

Referring to FIG. 5, the main communication signal transmitted in Manchester code may be composed of six parts P1 to P6.

A low-rate communication clock signal may be transmitted through the first part P1. In the main communication signal, data bits may be encoded with Manchester-II code, and in this case, one bit may be composed of two unit pulses UI. In Manchester-II coding, when all data bits transmitted in the first part P1 represent 0 or 1, pulses synchronized with the low-rate communication clock signal may be transmitted.

The receiving side (e.g., data driving device) may perform training according to the low-rate communication clock signal received in the first part P1.

After the low-rate communication clock signal is transmitted, a start signal indicating the start of a message may be transmitted in the second part P2, and an end signal indicating the end of the message may be transmitted in the sixth part P6 that is the last part of the message.

A message header is transmitted in the third part P3, and the message header may include parameter values such as a data type, a mode, an identification number (ID) of a receiving side, a data length, and a setting register address of the receiving side.

In addition, the fourth part P4 may include information transmitted and received through the message.

Further, the fifth part P5 may include a cyclical redundancy check (CRC) value.

Referring back to FIG. 4, the data processing device may include a P-subsidiary communication circuit 420 which includes a P-subsidiary communication control circuit 422 and a P-subsidiary communication signal processing circuitry 421.

The P-subsidiary communication signal processing circuit 421 may receive a subsidiary communication signal LCK from the subsidiary communication line CLA or transmit the subsidiary communication signal LCK through the subsidiary communication line CLA. The subsidiary communication signal LCK to be transmitted may be separately referred to as a subsidiary communication feedback signal.

The P-subsidiary communication control circuit 422 checks the subsidiary communication signal LCK received from the subsidiary communication line CLA, and if the subsidiary communication signal LCK indicates an abnormality in the data driving device, may transmit a subsidiary communication feedback signal of the same type of the subsidiary communication signal LCK through the subsidiary communication line CLA. Here, a line through which the subsidiary communication signal LCK is received from the data driving device may be physically separated from a line through which the subsidiary communication feedback signal is transmitted.

The P-subsidiary communication control circuit 422 may generate the subsidiary communication feedback signal regardless of the subsidiary communication signal LCK received from the subsidiary communication line CLA and transmit the subsidiary communication feedback signal through the subsidiary communication line CLA. For example, when the P-subsidiary communication control circuit 422 wants to switch the mode of the data driving device, the P-subsidiary communication control circuit 422 may include a reset signal in the subsidiary communication feedback signal and transmit the same.

The P-control circuit 430 is a circuit that controls overall functions of the data processing device 110. The P-control circuit 430 may determine operation modes of the data processing device and determine circuits operating in each operation mode.

FIG. 6 is a block diagram of a data driving device according to an aspect. When the data driving device is composed of a plurality of data driving integrated circuits, the configuration shown in FIG. 6 may be understood as a configuration included in one data driving integrated circuit.

Referring to FIG. 6, the data driving device 120 may include a D-main communication circuit 610, a D-subsidiary communication circuit 620, a D-control circuit 630, a D-memory 640, and a data driving circuit 650.

The D-main communication circuit 610 may receive a main communication signal MDT to the data processing device through a main communication line CLM. The D-main communication circuit 610 may receive image data and first control data in an active period and receive second control data in a blank period through the main communication line CLM. Further, the data driving circuit 650 may drive the pixels of the display panel according to the image data. The first control data may include a control value applied in units of lines or pixels of the display panel, and the second control data may include a control value applied in a longer cycle than the line unit or pixel unit or a control value applied on a frame by frame basis.

The D-main communication circuit 610 may receive configuration data at a first data rate through the main communication line CLM. In addition, the D-main communication circuit 610 may receive image data, the first control data, and the second control data at a second data rate higher than the first data rate through the main communication line CLM. A mode in which communication is performed at the first data rate may be referred to as a low-speed communication mode, and a mode in which communication is performed at the second data rate may be referred to as a high-speed communication mode.

The D-main communication circuit 610 may include a D-high-speed communication circuit 611 that performs high-speed communication and a D-low-speed communication circuit 616 that performs low-speed communication.

The D-main communication circuit 610 may include a first deserializer 612, a decoder 613, a descrambler 614, and an unpacker 615.

The first deserializer 612 may parallelize the main communication signal MDT serially received through the main communication line CLM in units of bytes or symbols.

Then, the decoder 613 may decode data encoded with DC balance code, for example, 6B7B code, or encoded with LRLC.

The decoder 613 may perform decoding on each piece of unit data according to a decoding table stored in the D-memory 640. Here, when it is confirmed that unit data included in the data is not included in the decoding table, the decoder 613 may generate an error signal.

Then, the decoder 613 may check whether the received data satisfies criteria of LRLC coding. For example, the decoder 613 may generate an error signal when it is confirmed that the run-length of the received data exceeds a reference value.

The descrambler 614 may restore scrambled data to original data according to a rule agreed in advance.

The unpacker 615 may arrange the received data in units of pixels and transmit image data for each pixel to the data driving circuit 650.

The D-low-speed communication circuit 616 may include a second deserializer 617 and a configuration data storage circuit 618.

The second deserializer 617 may parallelize configuration data serially received through the main communication line CLM. The configuration data may be received in the form of Manchester code, and the second deserializer 617 may decode the received configuration data into Manchester code and then transfer the same to the configuration data storage circuit 618.

The configuration data storage circuit 618 may receive the configuration data and store setting values included in the configuration data in the D-memory 640 or apply the setting values to circuits corresponding to the setting values.

The P-memory in the data processing device and the D-memory in the data driving device may be registers, read only memories (ROMs), or random access memories (RAMs).

The D-subsidiary communication circuit 620 may include a D-subsidiary communication control circuit 621 and a D-subsidiary communication signal processing circuit 622.

The D-subsidiary communication control circuit 621 may include the state signal generation circuit 320 (refer to FIG. 3) and the performance evaluation feedback circuit 330 (refer to FIG. 3) described with reference to FIG. 3, and D-subsidiary communication signal processing circuit 622 may include the signal combination circuit 310 (refer to FIG. 3) described with reference to FIG. 3.

The D-subsidiary communication control circuit 621 may check an abnormal state of the main communication signal MDT, an abnormal state of the main communication circuit 610 and/or abnormal states of other components and generate a status signal. Alternatively, the D-subsidiary communication control circuit 621 may evaluate the performance of main communication based on a recognition rate of a test pattern received to evaluate the performance of the main communication, and generate a performance evaluation feedback signal according to the evaluation result.

The D-subsidiary communication signal processing circuit 622 may generate a subsidiary communication signal LCK using the state signal or the performance evaluation feedback signal and transmit the subsidiary communication signal LCK through a subsidiary communication line CLA.

The D-subsidiary communication signal processing circuit 622 may generate the subsidiary communication signal LCK by combining a subsidiary communication signal transmitted from another data driving integrated circuit through the subsidiary communication line CLA or the subsidiary communication feedback signal and the state signal or the performance evaluation feedback signal transmitted from the data processing device.

The D-control circuit 630 is a circuit that controls overall functions of the data driving device 120. The D-control circuit 630 may determine operation modes of the data driving device and determine circuits operating in each operation mode.

FIG. 7 is a diagram showing sequences of main signals according to an aspect.

Referring to FIG. 7, a waveform of a driving voltage VCC is shown. The driving voltage VCC initially has a low level and then changes to a high level at a certain point in time. The point in time at which the driving voltage VCC changes to the high level may be understood as a driving time of the display driving device, for example, the data processing device and the data driving device.

After the driving time, the data processing device and the data driving device may operate in a configuration data mode. After the operation in the configuration data mode is completed, the data processing device and the data driving device may operate in a display mode.

In a configuration data period T710, the data processing device may continuously transmit a preamble packet P710 and a configuration data packet P720 through the main communication signal MDT.

The data processing device may change the voltage of a subsidiary communication feedback signal LCKf from a low level to a high level while sending the preamble packet P710. Through this voltage change, the data processing device may notify the data driving devices that the preamble packet is being transmitted.

The voltage of the main communication signal MDT in the preamble packet P710 may be periodically changed to a high level and a low level, and the data driving device may train a low-rate communication clock signal for receiving the configuration data packet P720 using the preamble packet P710.

The data processing device may transmit the preamble packet P710 and the configuration data packet P720 at a relatively low first data rate. The low-rate communication clock signal has the first data rate, and the data driving device may train the low-rate communication clock signal using the preamble packet P710.

When the low-rate communication clock signal is trained, the data driving device may inform the data processing device of the clock training state through a subsidiary communication signal LCKd. For example, the data driving device may change the voltage of the subsidiary communication signal LCKd from a low level to a high level when the low-rate communication clock is trained. The waveform of the subsidiary communication signal LCKd shown in FIG. 7 is the subsidiary communication signal of the data driving integrated circuit disposed at the end of a plurality of data driving integrated circuits forming one cascade structure in the data driving device.

The data processing device may transmit the configuration data packet P720 after confirming that the data driving device has trained the low-rate communication clock signal through the subsidiary communication signal LCKd.

FIG. 8 is a configuration diagram of the configuration data packet according to an aspect.

Referring to FIG. 8, the configuration data packet P720 may include a configuration data start packet P810, a configuration data header packet P820, a configuration data header verification packet P830, a configuration data body packet P840, a configuration data body verification packet P850, and a configuration data end packet P860.

The configuration data start packet P810 may indicate the start of the configuration data packet P720. The configuration data end packet P860 may indicate the end of the configuration data packet P720.

The configuration data header packet P820 may include an indication value for communication of the configuration data body packet P840. For example, the configuration data header packet P820 may include an indication value for the length of the configuration data body packet P840.

The configuration data header verification packet P830 may include a verification value for verifying data validity of the configuration data header packet P820. For example, the configuration data header verification packet P830 may include a CRC value of the configuration data header packet P820.

The configuration data body packet P840 may include setting values of the data driving device required before high-speed communication. For example, the configuration data body packet P840 may include setting values of a circuit that performs high-speed communication in the data driving device.

The configuration data body verification packet P850 may include a verification value for verifying data validity of the configuration data body packet P840. For example, the configuration data body verification packet P850 may include a CRC value of the configuration data body packet P840.

Referring back to FIG. 7, the data processing device may maintain the main communication signal MDT at a high level voltage or a low level voltage for a predetermined time after completing transmission of the configuration data packet P720. Such a packet may be called a high voltage packet or a low voltage packet P730, and the data driving device may recognize that the configuration data period T710 ends when the high voltage packet or low voltage packet P730 is received. When a signal maintained at a high level voltage or a low level voltage for a predetermined time is received, the clock signal is broken, and the data driving device may recognize this as the end of the configuration data period T710.

When the first communication signal MDT is maintained at a high level voltage or a low level voltage for a predetermined time after the data driving device recognizes the configuration data end packet P860 (refer to FIG. 8) through the first communication signal MDT, the data driving device may determine that the configuration data period T710 ends and enter a display period T720.

After the configuration data period T710 ends, the data processing device and the data driving device may enter the display period T720. The display period T720 may include a clock training period T730 and a frame period T740. When a high-rate communication clock signal is trained in the clock training period T730, the frame period T740 appears repeatedly thereafter.

In the clock training period T730, the data processing device may transmit a clock training pattern P740 at the second data rate to the data driving device. Then, the data driving device may train the high-rate communication clock signal corresponding to the second data rate for the clock training pattern P740. Here, the second data rate may have a higher frequency than the first data rate.

If the data driving device fails to train the high-rate communication clock signal in the clock training period T730, the data driving device may transmit a clock training failure signal through the subsidiary communication signal LCKd. For example, the data driving device may notify the data processing device of a clock training failure by lowering the voltage of the subsidiary communication signal LCKd from a high level to a low level.

If clock training for the high-rate communication clock signal fails, the data processing device may additionally transmit the clock training pattern P740 or return to the configuration data mode.

When clock training for the high-rate communication clock signal is completed, the data processing device and the data driving device may enter the frame period T740.

The frame period T740 may include an active period T750 and a blank period T760. The active period T750 may be a period in which image data and control data are transmitted on a line by line basis, and the blank period T760 may be a period in which image data in units of lines is not transmitted. The blank period T760 may be divided into a horizontal blank period and a vertical blank period. Hereinafter, for convenience of description, the blank period T760 will be described as a vertical blank period.

In the active period T750, the data processing device may transmit a line data packet P750 on a line by line basis.

FIG. 9 is a configuration diagram of the line data packet according to an aspect.

Referring to FIG. 9, the line data packet P750 may include a line data start packet P910, a first control data body packet P920, an image data packet P930, and a clock training pattern P940.

The line data start packet P910 may indicate the start of the line data packet P750. LRLC coding or scrambling may not be applied to the line data start packet P910.

The first control data body packet P920 may include setting values that may be changed on a line by line basis or may be changed at any time. For example, the first control data body packet P920 may include a polarity value indicating the polarity of each pixel and a value indicating whether or not a scrambler is reset.

The image data packet P930 may include grayscale values of pixels disposed on one line.

The clock training pattern P940 may include a pattern signal capable of training the high-rate communication clock signal.

Referring again to FIG. 7, the data processing device may enter the blank period T760 after transmitting the line data packet P750 for all lines in the active period T750.

In the blank period T760, the data processing device may transmit the control data packet P760 in units of virtual lines.

FIG. 10 is a configuration diagram of the control data packet according to an aspect.

Referring to FIG. 10, the control data packet P760 may include a control data start packet P1010, a second control data body packet P1020, a verification packet P1030, a dummy packet P1040, and a clock training pattern P1050.

The control data start packet P1010 may indicate the start of the control data packet P760. LRLC coding or scrambling may not be applied to the control data start packet P1010.

The second control data body packet P1020 may include setting values that are changed on a frame by frame basis or are not changed at any time. Alternatively, according to an aspect, the second control data body packet P1020 may include setting values similar to or identical to those of the first control data body packet.

The verification packet P1030 may include CRC data. Here, the CRC data may include a CRC value received in the configuration data period. For example, the CRC data may include a CRC value of the configuration data header packet P820 (refer to FIG. 8) included in the configuration data header verification packet P830 (refer to FIG. 8). Further, the CRC data may include a CRC value of the configuration data body packet P840 (refer to FIG. 8) included in the configuration data body verification packet P850 (refer to FIG. 8).

The data driving device may check a communication error while comparing a CRC value received in the configuration data period with a CRC value received in the verification packet P1030.

As described above, one aspect performs different types of communication for each period. Under these conditions, one aspect proposes a data validation method optimized for a communication type in each period to improve the efficiency of data validation.

FIG. 11 is a flowchart of a data validation method according to an aspect.

Referring to FIG. 11, the data processing device 110 may generate configuration data (S1102). The configuration data may include high-speed communication setting values for smoothly performing high-speed communication, for example, communication for transmitting and receiving data at the second data rate.

The data processing device 110 may transmit the configuration data to the data driving device 120 at the first data rate through the main communication line. Then, the data driving device 120 may receive the configuration data at the first data rate (S1104).

The data driving device 120 may determine an error in the configuration data according to a first rule (S1106). Then, the data driving device 120 may feedback whether or not the configuration data has an error to the data processing device 110 through the subsidiary communication line (S1108).

The data processing device 110 may convert image data to be suitable for the data driving device 120 (S1110).

Then, the data processing device 110 may transmit image data to the data driving device 120 at the second data rate through the main communication line. The data driving device 120 may receive the image data at the second data rate (S1112). Here, the second data rate may be higher than the first data rate. Communication at the first data rate may be regarded as low-speed communication, and communication at the second data rate may be regarded as high-speed communication.

The data driving device 120 may determine an error in the image data according to a second rule different from the first rule (S1114). Then, the data driving device 120 may feedback whether or not the image data has an error to the data processing device 110 through the subsidiary communication line (S1116).

In the data driving device 120, communication at the first data rate may be performed by the D-low-speed communication circuit, and communication at the second data rate may be performed by the D-high-speed communication circuit.

As an example of determining a communication error, the D-low-speed communication circuit may determine an error in configuration data through CRC check.

As another example, the D-high-speed communication circuit may determine image data as error data upon confirming an error in a process of decoding the image data.

The D-high-speed communication circuit may determine image data as error data upon confirming that one piece of unit data included in the image data is not included in the decoding table. The data processing device may perform LRLC coding or 6B7B coding on one piece of unit data, and if the D-high-speed communication circuit fails to retrieve the unit data from a decoding table for LRLC coding or 6B7B coding, the D-high-speed communication circuit may determine that an error occurs in the communication process for the unit data.

The D-high-speed communication circuit may determine received image data as error data when a part in which the run-length exceeds a reference value in the image data is detected. Even though the data processing device performs LRLC coding on image data such that the run-length does not exceed the reference value and transmits the image data, if there is an error in a communication process, the D-high-speed communication circuit may receive data exceeding the reference value. Accordingly, the D-high-speed communication circuit may determine received image data as error data when a part in which the run-length exceeds the reference value in the image data is detected.

Errors may be double checked. For example, the D-low-speed communication circuit may determine an error in configuration data through a CRC check. A CRC check value at this time may be stored in the memory. In addition, the D-high-speed communication circuit may receive the second control data at the second data rate, and the second control data may include a CRC comparison value. The D-high-speed communication circuit may determine a communication error by comparing the CRC comparison value and the CRC check value. The CRC comparison value received at the second data rate through high-speed communication may have an error, and the CRC check value received at the first data rate through low-speed communication may have an error. The D-high-speed communication circuit may determine that one of the two values has an error and feedback the communication error to the data processing device.

The main communication signal may be an embedded clock signal. Since a clock signal is embedded in the main communication signal, the data driving device may require clock training in the initial period of communication.

The D-high-speed communication circuit may include a clock recovery circuit, and the clock recovery circuit may receive a clock training signal from the data processing device and train the high-rate communication clock signal at the second data rate.

The clock training signal may have a certain pattern. For example, the clock training signal may have a pattern in which a high level voltage and a low level voltage alternate at a frequency of the second data rate. After the clock recovery circuit receives the clock training signal and completes training of the high-rate communication clock signal, the clock recovery circuit may determine a communication error by checking the pattern in the clock training signal. For example, the clock recovery circuit may determine a communication error by recognizing the clock training signal as data and checking whether the pattern of the data is normal after completion of clock training.

The frequency of the clock signal restored from the embedded clock signal may also vary slightly. However, in the case of considerable frequency change, the possibility of communication error is high.

The D-high-speed communication circuit may receive the clock training signal through the main communication line to train the high-rate communication clock signal at the second data rate, receive the embedded clock signal through the main communication line to maintain the high-rate communication clock signal, and determine a communication error by comparing the frequency of the high-rate communication clock signal at the time of training completion with the frequency of the high-rate communication clock signal at a point in time after completion of training. Here, the clock recovery circuit in the D-high-speed communication circuit may be configured in the form of a phase lock loop (PLL) a delay lock loop (DLL).

Meanwhile, the D-high-speed communication circuit may evaluate communication performance through a bit error rate (BER) test pattern received at the second data rate.

The data processing device may transmit the BER test pattern to the data driving device. The data driving device may count the number of reception errors using the BER test pattern. In addition, the data driving device may feedback communication errors through the subsidiary communication line when the number of reception errors is equal to or greater than a threshold value.

When the data driving device is composed of a plurality of data driving integrated circuits, a BER test may be sequentially performed on the plurality of data driving integrated circuits. For example, after the BER test is performed on the first data driving integrated circuit, the BER test on the second data driving integrated circuit may be performed.

A data driving integrated circuit undergoing the BER test may ignore subsidiary communication signals transmitted from other data driving integrated circuits. In addition, a data driving integrated circuit on which the BER test is not performed may bypass and output subsidiary communication signals transmitted from other data driving integrated circuits.

FIG. 12 is a diagram showing that a data driving integrated circuit according to an aspect ignores a subsidiary communication signal transmitted from another data driving integrated circuit, and FIG. 13 is a diagram showing that a data driving integrated circuit according to an aspect bypasses a subsidiary communication signal transmitted from another data driving integrated circuit.

Referring to FIG. 12, in the data driving integrated circuit, the performance evaluation feedback circuit 330 may generate a performance evaluation feedback signal SIG2 according to a BER test result. For example, the performance evaluation feedback circuit 330 may reduce the voltage of the performance evaluation feedback signal SIG2 from a high level to a low level when the number of reception errors in a BER test is equal to or greater than a threshold value or when a normal reception rate is less than a predetermined value.

In this case, the signal combination circuit 310 may generate a subsidiary communication signal LCK by combining the performance evaluation feedback signal SIG2 and a state signal SIG1.

When the performance evaluation feedback circuit 330 performs a BER test, the signal combination circuit 310 may ignore a subsidiary communication signal LCK' transmitted from another data driving integrated circuit.

Referring to FIG. 13, the data driving integrated circuit may not generate the performance evaluation feedback signal SIG2 or the state signal SIG1 when the data driving integrated circuit does not perform a BER test. The signal combination circuit 310 may bypass and output the subsidiary communication signal LCK' received from another data driving integrated circuit.

According to this method, the data driving device may individually receive feedback of BER test results of the data driving integrated circuits.

Meanwhile, the data processing device may transmit symbols composed of N (N being a natural number equal to or greater than 2) bits, and the data driving device may match each symbol with a value composed of M (M being a natural number smaller than N) bits.

This method of transmitting and receiving a bit value in units of symbols may be used at the time of transmitting and receiving a power saving control value and may also be used at the time of transmitting and receiving packets in which the possibility of error needs to be reduced, such as line data packets and control data packets.

FIG. 14 is a diagram showing an example of symbol setting values according to an aspect.

Referring to FIG. 14, the data driving device may receive a first symbol 1410 composed of 8 bits. Then, the data driving device may match the first symbol 1410 with a 1-bit value having a value of 1.

Then, the data driving device may receive a second symbol 1420 composed of 8 bits. Then, the data driving device may match the second symbol 1420 with a 1-bit value having a value of 0.

By transmitting and receiving bit values in units of symbols in this way, it is possible to reduce the possibility of error in setting values. Further, the data driving device may perform self-repairing even if an error occurs in some bits.

FIG. 15 is a diagram showing repairing of a bit error of a symbol according to an aspect.

Referring to FIG. 15, the data driving device may receive a third symbol 1510 composed of 8 bits. When the data driving device is appointed to receive only the first symbol and the second symbol described with reference to FIG. 14, the data driving device may determine that the third symbol 1510 has an error and compare the third symbol 1510 with the first symbol and/or the second symbol 1420. Then, the data driving device may select the second symbol 1420 that is more similar to the third symbol 1510 and repair the error bit of the third symbol 1510 using the second symbol 1420.

Alternatively, the data driving device may confirm that the third symbol 1510 is not an appointed symbol using symbols received before or after receiving the third symbol 1510 and recover errors in some bits of the third symbol 1510.

The data driving device may include a first communication circuit that receives first data at the first data rate through a communication line and determines an error of the first data according to the first rule, a second communication circuit that receives second data at the second data rate higher than the first data rate through a communication line and determines an error of the second data according to the second rule different from the first rule, and a data driving circuit that drives the pixels of the display panel according to image data included in the second data.

The second communication circuit may determine the second data as error data when it is confirmed that one piece of unit data included in the second data is not included in the decoding table.

Further, the second communication circuit may determine the second data as error data when a part in which the run-length exceeds a reference value is detected in the second data.

In addition, the second communication circuit may determine the second data as error data when an error is detected in a process of decoding the second data.

The first communication circuit may determine an error of the first data through a cyclical redundancy check (CRC) check. Then, the first communication circuit may store the CRC check value in the memory, and the second communication circuit may receive third data at the second data rate, compare a CRC comparison value included in the third data with the CRC check value, and determine a communication error.

The second communication circuit may receive a clock training signal, train a communication clock signal at the second data rate, and determine a communication error by checking a clock training pattern in the clock training signal after completion of training.

The second communication circuit may receive the clock training signal through the communication line, train the communication clock signal at the second data rate, receive an embedded clock signal through the communication line, maintain the communication clock signal, and determine a communication error by comparing the frequency of the communication clock signal at training completion time with the frequency of the communication clock signal at a time after completion of training.

The second communication circuit may evaluate communication performance through a BER test pattern received at the second data rate. The first communication circuit may receive setting values for a BER test at the first data rate.

The second communication circuit may receive symbols composed of N (N being a natural number equal to or greater than 2) bits through the second data and match each symbol with a value composed of M (M being a natural number smaller than N) bits. The second communication circuit may recover a 1-bit error included in one symbol using another one symbol received before or after one symbol.

Some contents related to data validity will be summarized from the viewpoint of the data processing device. The data processing device may include a first communication circuit that transmits first data and first verification data for the first data at a first data rate through a communication line, and a second communication circuit that transmits second data including image data for driving the pixels of the display panel at a second data rate higher than the first data rate through a communication line and transmits second verification data corresponding to the first verification data at the second data rate.

The first verification data may include a cyclical redundancy check (CRC) check value for the first data, and the second verification data may include a CRC comparison value corresponding to the CRC check value. The second communication circuit may transmit the second data in an active period between the active period and a blank period included in one frame period, and transmit third data including the second verification data in the blank period.

The second communication circuit may encode the second data according to a limited run length coding (LRLC) method using a predetermined encoding table.

The first communication circuit may transmit a setting value for a BER test at the first data rate, and the second communication circuit may transmit a BER test pattern at the second data rate.

In addition, the second communication circuit may match a value composed of M (M being a natural number) bits with a symbol composed of N (N being a natural number greater than M) bits, include the symbol in the second data, and transmit the second data including the symbol.

If an error is determined in data validity, the data processing device and the data driving device may recover the error while switching operation modes. Alternatively, the data processing device and the data driving device may switch to another mode when all operations in one mode are completed.

FIG. 16 is a diagram showing a mode switching sequence of the display driving device according to an aspect.

Referring to FIG. 16, the data processing device and the data driving device may operate in a first mode in a configuration data period T710, and the P-low-speed communication circuit of the data processing device and the P-low-speed communication circuit of the data driving device may transmit and receive configuration data at the first data rate in the first mode.

When an error occurs in the first mode (LF11), the data processing device and the data driving device may perform the first mode again.

When all operations in the configuration data period T710 have been normally performed (LP11), the data processing device and the data driving device may switch from the first mode to a second mode and perform operations in a clock training period T730.

In the second mode, the data processing device may transmit a clock training signal at the second data rate and the data driving device may train a high-rate communication clock signal for communication at the second data rate.

When an error occurs in the second mode (LF12), the data processing device and the data driving device may switch to the first mode and then perform the first mode operations again.

When all operations in the clock training period (T730) have been normally performed (LP12), the data processing device and the data driving device switch from the second mode to a third mode and perform operations in an active period (T750).

In the third mode, the data processing device may transmit image data and the first control data at the second data rate, and the data driving device may drive the pixels of the display panel according to the image data.

In the third mode, the data processing device and the data driving device may transmit the image data and the first control data on a line by line basis. At this time, when an operation has been normally performed for one line (AL1), the same operation may be performed for the next line.

If an error occurs in the third mode (LF2), the data processing device and the data driving device may perform clock training again after switching to the second mode. When an error occurs in the third mode, the data processing device and the data driving device switch to the second mode instead of the first mode. According to this sequence, the data processing device and the data driving device may reduce an error recovery time. In particular, according to this sequence, it is possible to minimize image quality deterioration time to improve the image quality because the third mode is an active period.

When all operations in the active period T750 have been normally performed (VB1), the data processing device and the data driving device switch from the third mode to a fourth mode and perform operations in a blank period T760.

In the fourth mode, the data processing device may transmit the second control data at the second data rate, and the data driving device may apply setting values necessary to drive the display panel according to the second control data.

In the fourth mode, the data processing device and the data driving device may transmit the second control data in units of virtual lines. At this time, when an operation has been normally performed for one virtual line (VB2), the same operation may be performed for the next virtual line.

When all operations in the blank period (T760) have been normally performed (AL2), the data processing device and the data driving device switch from the fourth mode to the third mode and perform the operations in the active period (T750).

When an error occurs in the fourth mode (LF13), the data processing device and the data driving device may switch to the first mode. The data processing device and the data driving device may re-determine most settings from the initial state while switching to the first mode. Since the fourth mode is performed in the blank period (T760) in which the display panel is not updated, problems in image quality may be minimized even if the recovery time is relatively long.

Front the viewpoint of the data driving device performing operations in the aforementioned sequence, the data driving device may include a D-low-speed communication circuit, a D-high-speed communication circuit, a D-control circuit, and a data driving circuit.

The D-low-speed communication circuit may receive configuration data at the first data rate in the first mode.

The D-high-speed communication circuit may train the high-rate communication clock signal for communication at the second data rate in the second mode, receive image data and the first control data using the high-rate communication clock signal in the third mode, and receive the second control data using the high-rate communication clock signal in the fourth mode.

The D-control circuit may switch the mode to the second mode when the first mode is completed, switch the mode to the third mode when the second mode is completed, switch the mode to the second mode when an abnormal state is detected in the third mode, and switch the mode to the first mode when an abnormal state is detected in the fourth mode.

Further, the data driving circuit may drive the pixels of the display panel according to the image data.

Here, the second data rate may be higher than the first data rate.

The D-control circuit may switch the mode to the first mode when an abnormal state is detected in the second mode.

The D-high-speed communication circuit includes a clock recovery circuit, and the configuration data may include a setting value of the clock recovery circuit.

The D-high-speed communication circuit includes an equalizer circuit, and the configuration data may include a setting value of the equalizer circuit.

When the first mode is repeated L (L being a natural number equal to or greater than 2) times or more, the setting value of the equalizer circuit may be changed and received. As an example, if the operation of switching to the first mode is repeated L times or more within one frame time after switching to the second mode from the first mode, the data processing device may change the setting value of the equalizer circuit of the D-high-speed communication circuit and transmit the changed setting value.

The data driving device may further include a D-subsidiary communication circuit that transmits a subsidiary communication signal through a subsidiary communication line.

When the D-control circuit detects an abnormal state in the third mode or the fourth mode, the D-subsidiary communication circuit may transmit a signal indicating the abnormal state to the data processing device through the subsidiary communication signal.

The image data, the first control data, and the second control data are embedded clock signals, and the D-high-speed communication circuit may extract a clock signal from the embedded clock signals and maintain the high-rate communication clock signal.

The D-control circuit may determine a state in which a communication clock signal is not maintained as an abnormal state.

The third mode may be performed in an active period in which the display is updated in one frame period, and the fourth mode may be performed in a blank period in the one frame period.

From the viewpoint of the data processing device operating in this sequence, the data processing device may include a P-low-speed communication circuit, a P-high-speed communication circuit, and a P-control circuit.

The P-low-speed communication circuit may transmit configuration data at the first data rate in the first mode.

The P-high-speed communication circuit may transmit a clock training signal to train the high-rate communication clock signal at the second data rate in the second mode, transmit image data and the first control data according to the high-rate communication clock signal in the third mode, and transmit the second data according to the high-rate communication clock signal in the fourth mode.

The P-control circuit may switch the mode to the second mode when the first mode is completed, switch the mode to the third mode when the second mode is completed, switch the mode to the second mode when an abnormal state is detected in the third mode, and switch the mode to the first mode when an abnormal state is detected in the fourth mode.

The second data rate may be higher than the first data rate.

The P-control circuit may switch the mode to the first mode when an abnormal state is detected in the second mode.

When switching from the second mode to the first mode is repeated L (L being a natural number equal to or greater than 2) time or more, the P-low-speed communication circuit may change setting values for communication at the second data rate, include the changed setting values in configuration data, and transmit the configuration data.

The data processing device may further include a subsidiary communication circuit that receives a subsidiary communication signal through a subsidiary communication line. The P-control circuit may check an abnormal state in each mode through the subsidiary communication signal.

When transition of the subsidiary communication signal from a high level voltage to a low level voltage occurs, the P-control circuit may recognize that an abnormal state has occurred.

Meanwhile, the display driving device according to an aspect may further perform a low-power operation.

FIG. 17 is a diagram showing a sequence in which the display driving device performs a low-power operation according to an aspect.

Referring to FIG. 17, the display device may alternately perform an operation in the active period T750 and an operation in the blank period T760 in a normal mode. In addition, the display device may refresh the image of the display panel in the active period T750.

To update the image of the display panel, the data processing device may transmit image data RGB to the data driving device in the active period T750. The image data RGB may be transmitted on a line by line basis. To transmit setting values on a line by line basis, the data processing device may further transmit the first control data in the active period T750.

Meanwhile, for low power operation, the data processing device may transmit the second control data in the blank period T760. Further, the second control data may include a power saving control value for low power operation.

In the normal mode, the power saving control value may be set to "disable (D)" and transmitted. When the power saving control value set to "disable (D)" is received, the data driving device may control an output circuit to operate normally.

To lower the refresh rate in the power saving mode, the data processing device may set the power saving control value to "enable (E1, E2)" and transmit the power saving control value.

When the power saving control value set to "enable (E1, E2)" is received, the data driving device may disable some circuits. For example, the data driving circuit of the data driving device may include a latch circuit that latches image data per pixel, a digital-analog-converter (DAC) that converts output data of the latch circuit into an analog data voltage, and an output buffer that outputs the data voltage to a pixel. The data driving device may determine on/off of the DAC and the output buffer according to the power saving control value.

The data driving device may also disable a main communication circuit when the power saving control value set to "enable (E1, E2)" is received. At this time, since the high-rate communication clock signal is not restored when the main communication circuit is disabled, the data driving device may convert the voltage of the subsidiary communication signal LCK to a low level. The data processing device may recognize such conversion of the voltage of the subsidiary communication signal LCK and confirm that the data driving device has entered the power saving mode.

The main communication circuit may receive a clock training signal to train the high-rate communication clock signal or receive an embedded clock signal to maintain the high-rate communication clock signal. However, when a main communication signal is not supplied in the power saving mode, the data driving device cannot maintain the high-rate communication clock signal. Accordingly, the data driving device may transmit the clock training signal CT to the data driving device before the active period T750 starts again. Then, the data driving device may train the high-rate communication clock signal again through the clock training signal CT and inform the data processing device of completion of training through the subsidiary communication signal LCK.

The display device may retransmit configuration data CFG at the time of switching from the power saving mode to the normal mode. The image data RGB may be transmitted at the second data rate, and the configuration data CFG may be transmitted at the first data rate lower than the second data rate.

The data driving device may convert the voltage of the subsidiary communication signal LCK from a low level to a high level when all operations of receiving the configuration data CFG are completed.

Whether to restart the data driving device from clock training for the high-rate communication clock signal after the power saving mode or to transmit/receive the configuration data again may be determined according to the power saving control value.

The power saving control value may include a first power saving control value and a second power saving control value.

Here, the first power saving control value may include a value for determining whether to enter the power saving mode. For example, the data driving device may enter the power saving mode if the first power saving control value is set to "enable" and may operate in the normal mode instead of entering the power saving mode if the first power saving control value is set to "disable."

Next, the second power saving control value may indicate which process will be restarted first after the power saving mode ends. For example, when the second power saving control value is a value indicating the display mode, the data processing device and the data driving device may restart from the clock training process for high-speed communication. When the second power saving control value is a value indicating the configuration data mode, the data processing device and the data driving device may restart from the process of transmitting and receiving configuration data through low-speed communication.

From the viewpoint of the data driving device that performs the above-described power saving operation, the data driving device may include a D-main communication circuit and a data driving circuit. The D-main communication circuit may receive image data and the first control data in an active period and receive the second control data in a blank period through a main communication line. Further, the data driving circuit may drive the pixels of the display panel according to the image data and determine the power saving operation of the output circuit according to a power saving control value included in the second control data.

The data driving circuit may also control the power saving operation of the D-main communication circuit according to the power saving control value.

The data driving device may further include a D-subsidiary communication circuit that transmits a subsidiary communication signal through a subsidiary communication line and indicates that the D-main communication circuit has entered the power saving mode through the subsidiary communication signal.

The D-main communication circuit may receive the clock training signal to train the high-rate communication clock signal for receiving image data, and the subsidiary communication signal may indicate that the D-main communication circuit has entered the normal mode after training of the high-rate communication clock signal through the subsidiary communication signal.

The power saving control value may include a first power saving control value for controlling the power saving operation of the D-main communication circuit and a second power saving control value for controlling a procedure for switching from the power saving mode to the normal mode.

When the second power saving control value is a first value, the D-main communication circuit may receive the clock training signal to train the high-rate communication clock signal for receiving image data.

The D-main communication circuit may wait for data reception at the first data rate lower than the second data rate for receiving image data when the second power saving control value is a second value.

The D-main communication circuit may receive the clock training signal corresponding to the second data rate after receiving configuration data at the first data rate.

The D-main communication circuit may receive symbols composed of N (N being a natural number equal to or greater than 2) bits and match each symbol with a power saving control value composed of M (M being a natural number smaller than N) bits.

The data driving circuit includes a latch circuit that latches image data on a pixel by pixel basis, a digital-analog-converter (DAC) that converts output data of the latch circuit into an analog data voltage, and an output buffer that outputs the data voltage to a pixel and may determine on/off of the DAC and the output buffer according to the power saving control value.

From the viewpoint of the data processing device that performs the above-described power saving operation, the data processing device may include an image data processing circuit and a P-main communication circuit. The image data processing circuit may process image data for driving the pixels of the display panel. In addition, the P-main communication circuit may transmit image data and the first control data in an active period and transmit the second control data including the power saving control value in a blank period through the main communication line.

The data processing device may further include a P-subsidiary communication circuit for receiving a subsidiary communication signal through a subsidiary communication line. In addition, the P-main communication circuit transmits a value indicating the power saving operation of the data driving device through the power saving control value, and the P-subsidiary communication circuit may confirm that the data driving device has entered the power saving mode through the subsidiary communication signal.

The P-main communication circuit may operate in the power saving mode for a certain period of time upon confirming that the data driving device has entered the power saving mode.

The P-main communication circuit may transmit a clock training signal after a predetermined time has elapsed and transmit image data when the data driving device confirms that clock training has been performed through the P-subsidiary communication circuit.

After transmitting a value indicating a normal operation of the data driving device through the power saving control value, the P-main communication circuit may transmit the clock training signal to the data driving device if it is confirmed that the data driving device has entered the power saving mode through the P-subsidiary communication circuit.

The power saving control value may include a first power saving control value for controlling the power saving operation of the data driving device and a second power saving control value for controlling a procedure of switching from the power saving mode to the normal mode, and the P-main communication circuit may set the second power saving control value to a first value and transmit the clock training signal to the data driving device after a predetermined time has elapsed.

The P-main communication circuit may set the second power saving control value to the first value and transmit configuration data at the first data rate lower than the second data rate for transmission of image data after a predetermined time has elapsed.

As described above, according to the present aspect, it is possible to improve the accuracy and efficiency of data validation by checking data validity in data communication through different methods depending on types of transmitted/received data and operation modes. Further, according to the present aspect, the amount of power consumption in data communication may be reduced, and the possibility of a malfunction of erroneously entering the power saving mode due to a communication error may be minimized. Moreover, according to the present aspect, even if an error occurs in one of a plurality of data driving devices, all data driving devices may be initialized simultaneously, and operation modes of the data driving devices and the data processing device may be easily synchronized. Furthermore, according to the present aspect, the operation modes of the data driving device and the data processing device may be easily managed and a recovery time when an error occurs may be minimized.

The data processing device may be a device that processes image data and transmits the image data and need not be construed as being limited to the above-described aspect. For example, the data processing device may be a timing controller that transmits image data to a source driver or a host that transmits image data to the timing controller.

The data driving device may be a device that receives image data and participates in driving pixels of a display panel using the image data, and need not be construed as being limited to the above-described aspect. For example, the data driving device may be a source driver that supplies a data voltage to a pixel, or a timing controller that supplies a grayscale value of each pixel to the source driver to adjust the grayscale of each pixel.

It will be apparent to those skilled in the art that various modifications and variations can be made in the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A display driving device comprising two or more integrated circuits configured to receive image data from a device through a main communication line, wherein the two or more integrated circuits are connected in a cascade form for subsidiary communication, a first integrated circuit disposed at an end of the cascade transmits a first subsidiary communication signal to the device through the subsidiary communication, and a second integrated circuit disposed at a beginning of the cascade receives a feedback signal for the first subsid- iary communication signal from the device, wherein a subsidiary communication output terminal of the first integrated circuit is connected to the device, and a subsidiary communication input terminal of the second integrated circuit is connected to the device.

2. The display driving device of claim 1, wherein each integrated circuit performs the subsidiary communication by combining an input signal received from the subsidiary communication input terminal and a state signal indicating a communication state of the main communication line and outputting the combined signal to the subsidiary communi- cation output terminal.

3. The display driving device of claim 2, wherein each integrated circuit outputs a subsidiary communication signal obtained by combining the input signal and the state signal through an AND operation to the subsidiary communication output terminal.

4. The display driving device of claim 2, wherein each integrated circuit determines that an abnormality has occurred in at least one of the two or more integrated circuits when the input signal or the state signal has a low level voltage.

5. The display driving device of claim 2, wherein each integrated circuit switches to a mode of retraining a com- munication clock signal of the main communication line when the input signal or the state signal has a low level voltage.

6. The display driving device of claim 1, wherein the device generates the feedback signal at a low level voltage and transmits the feedback signal when the first subsidiary communication signal has a low level voltage.

7. The display driving device of claim 1, wherein the device transmits a reset signal through the feedback signal, and the two or more integrated circuits receive the reset signal through the subsidiary communication.

8. The display driving device of claim 7, wherein each integrated circuit decreases a data rate of main communi- cation through the main communication line after the reset signal is received.

9. The display driving device of claim 8, wherein each integrated circuit receives the image data in a high-speed mode and receives configuration data for the high-speed mode in a low-speed mode having a lower data rate than the high-speed mode.

10. A display driving device comprising:

a main communication circuit configured to transmit image data to two or more integrated circuits through main communication lines; and a subsidiary communication circuit configured to receive a first subsidiary communication signal from a first integrated circuit disposed at an end of a cascade among the two or more integrated circuits connected in a cascade form for subsidiary communication and to transmit a feedback signal for the first subsidiary com- munication signal to a second integrated circuit dis- posed at a beginning of the cascade, wherein a subsidiary communication output terminal of the first integrated circuit is connected to the subsidiary communication circuit, and a subsidiary communica- tion input terminal of the second integrated circuit is connected to the subsidiary communication circuit.

11. The display driving device of claim 10, wherein the main communication circuit transmits a clock training signal for retraining a communication clock signal of the image data to the main communication lines when the first sub- sidiary communication signal indicates an abnormal state of at least one of the main communication lines.

12. The display driving device of claim 10, wherein the main communication circuit transmits the image data in a high-speed mode and transmits configuration data for the high-speed mode to the main communication lines in a low-speed mode having a lower data rate than the high- speed mode.

13. The display driving device of claim 12, wherein the main communication circuit switches from the high-speed mode to the low-speed mode when the first subsidiary communication signal indicates an abnormal state of at least one of the main communication lines.

14. The display driving device of claim 10, wherein the subsidiary communication circuit transmits a reset signal through the feedback signal to reset the two or more inte- grated circuits.

15. The display driving device of claim 10, wherein the subsidiary communication circuit generates the feedback signal at a low level voltage and transmits the feedback signal when the first subsidiary communication signal has a low level voltage.

16. The display driving device of claim 15, wherein the main communication circuit transmits a clock training signal for retraining a communication clock signal of the image data to the main communication lines when the first sub- sidiary communication signal has a low level voltage.

17. A display driving device comprising:

two or more integrated circuits connected in a cascade form for subsidiary communication; and a device configured to transmit image data to the two or more integrated circuits through main communication lines, to receive a first subsidiary communication signal from a first integrated circuit disposed at an end of the cascade, and to transmit a feedback signal for the first subsidiary communication signal to a second integrated circuit disposed at a beginning of the cascade, wherein a subsidiary communication output terminal of the first integrated circuit is connected to the device, and a subsidiary communication input terminal of the second integrated circuit is connected to the device.

18. The display driving device of claim 17, wherein each integrated circuit performs the subsidiary communication by combining an input signal received from the subsidiary communication input terminal and a state signal indicating a communication state of each main communication line and outputting the combined signal to the subsidiary communi- cation output terminal.

19. The display driving device of claim 18, wherein the subsidiary communication output terminal of the first inte- grated circuit is connected to the device, and the subsidiary communication input terminal of the second integrated circuit is connected to the device.

* * * * *